(12) United States Patent
Wilkinson et al.

(10) Patent No.: US 12,441,049 B2
(45) Date of Patent: Oct. 14, 2025

(54) 3D PRINTING OF SEAL CAPS

(71) Applicant: PPG Industries Ohio, Inc., Cleveland, OH (US)

(72) Inventors: Bryan W. Wilkinson, Pittsburgh, PA (US); Michael A. Bubas, Pittsburgh, PA (US); Renhe Lin, Stevenson Ranch, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 894 days.

(21) Appl. No.: 17/429,933

(22) PCT Filed: Feb. 10, 2020

(86) PCT No.: PCT/US2020/017441
§ 371 (c)(1),
(2) Date: Aug. 10, 2021

(87) PCT Pub. No.: WO2020/167633
PCT Pub. Date: Aug. 20, 2020

(65) Prior Publication Data
US 2022/0176617 A1   Jun. 9, 2022

Related U.S. Application Data

(60) Provisional application No. 62/803,682, filed on Feb. 11, 2019.

(51) Int. Cl.
*B29C 64/106* (2017.01)
*B29C 70/74* (2006.01)
(Continued)

(52) U.S. Cl.
CPC ............ *B29C 64/106* (2017.08); *B29C 70/74* (2013.01); *B29D 99/0053* (2013.01); *F16B 33/004* (2013.01); *F16B 37/14* (2013.01); *B29L 2031/26* (2013.01); *B33Y 10/00* (2014.12); *B33Y 40/20* (2020.01); *B33Y 70/00* (2014.12); *B33Y 80/00* (2014.12)

(58) Field of Classification Search
CPC ... B29C 70/74; B29D 99/0053; F16B 33/004; F16B 37/14; B33Y 10/00; B33Y 70/00; B33Y 80/00; B33Y 40/20; B29L 2031/26
See application file for complete search history.

(56) References Cited

U.S. PATENT DOCUMENTS

| | | | |
|---|---|---|---|
| 2,466,963 A | 4/1949 | Patrick et al. | |
| 3,517,082 A | 6/1970 | Cockerham | |

(Continued)

FOREIGN PATENT DOCUMENTS

| | | | |
|---|---|---|---|
| CA | 2378348 A1 | 2/2001 | |
| CA | 2950215 A1 | 12/2015 | |

(Continued)

OTHER PUBLICATIONS

Non-Final Office Action for U.S. Appl. No. 14/963,976, mailed on May 24, 2016, 9 pages.

(Continued)

*Primary Examiner* — Nahida Sultana

(57) ABSTRACT

Methods of fabricating seal caps using three-dimensional printing are disclosed. The seal caps are useful for sealing fasteners.

8 Claims, 4 Drawing Sheets

(51) Int. Cl.
  *B29D 99/00* (2010.01)
  *B29L 31/26* (2006.01)
  *B33Y 10/00* (2015.01)
  *B33Y 40/20* (2020.01)
  *B33Y 70/00* (2020.01)
  *B33Y 80/00* (2015.01)
  *F16B 33/00* (2006.01)
  *F16B 37/14* (2006.01)

(56) References Cited

U.S. PATENT DOCUMENTS

| | | |
|---|---|---|
| 3,563,957 A | 2/1971 | Beebe |
| 3,615,972 A | 10/1971 | Morehouse, Jr. et al. |
| 3,640,923 A | 2/1972 | Guthrie |
| 3,799,854 A | 3/1974 | Jerabek |
| 3,864,181 A | 2/1975 | Wolinski et al. |
| 3,881,074 A | 4/1975 | Massy et al. |
| 3,919,351 A | 11/1975 | Chang |
| 3,975,194 A | 8/1976 | Farnand et al. |
| 4,006,273 A | 2/1977 | Wolinski et al. |
| 4,044,176 A | 8/1977 | Wolinski et al. |
| 4,046,729 A | 9/1977 | Scriven et al. |
| 4,147,769 A | 4/1979 | Dea et al. |
| 4,220,679 A | 9/1980 | Backhouse |
| 4,366,307 A | 12/1982 | Singh et al. |
| 4,403,003 A | 9/1983 | Backhouse |
| 4,546,045 A | 10/1985 | Elias |
| 4,582,756 A | 4/1986 | Niinuma et al. |
| 4,609,762 A | 9/1986 | Morris et al. |
| 4,623,711 A | 11/1986 | Morris et al. |
| 4,681,811 A | 7/1987 | Simpson et al. |
| 4,722,943 A | 2/1988 | Melber et al. |
| 4,732,790 A | 3/1988 | Blackburn et al. |
| 4,787,451 A | 11/1988 | Mitchell |
| 4,798,746 A | 1/1989 | Claar et al. |
| 4,886,862 A | 12/1989 | Kuwamura et al. |
| 5,071,904 A | 12/1991 | Martin et al. |
| 5,114,989 A | 5/1992 | Elwell et al. |
| 5,225,472 A | 7/1993 | Cameron et al. |
| 5,262,259 A | 11/1993 | Chou et al. |
| 5,352,530 A | 10/1994 | Tanuma et al. |
| 5,432,226 A | 7/1995 | Aonuma et al. |
| 5,468,802 A | 11/1995 | Wilt et al. |
| 5,525,262 A | 6/1996 | Castellucci et al. |
| 5,536,756 A | 7/1996 | Kida et al. |
| 5,663,219 A | 9/1997 | Chokshi et al. |
| 5,777,061 A | 7/1998 | Yonek et al. |
| 5,849,832 A | 12/1998 | Virnelson et al. |
| 5,912,319 A | 6/1999 | Zook et al. |
| 5,942,556 A | 8/1999 | Friedlander et al. |
| 5,955,143 A | 9/1999 | Wheatley et al. |
| 5,959,071 A | 9/1999 | DeMoss et al. |
| 6,015,475 A | 1/2000 | Hsiech et al. |
| 6,172,179 B1 | 1/2001 | Zook et al. |
| 6,232,401 B1 | 5/2001 | Zook et al. |
| 6,235,800 B1 | 5/2001 | Kyuno et al. |
| 6,259,962 B1 | 7/2001 | Gothait |
| 6,372,849 B2 | 4/2002 | DeMoss et al. |
| 6,454,972 B1 | 9/2002 | Morissette et al. |
| 6,479,622 B1 | 11/2002 | Gross et al. |
| 6,486,297 B2 | 11/2002 | Zook et al. |
| 6,509,418 B1 | 1/2003 | Zook et al. |
| 6,525,158 B1 | 2/2003 | Hoffman |
| 6,525,168 B2 | 2/2003 | Zook et al. |
| 6,551,710 B1 | 4/2003 | Chen et al. |
| 6,558,753 B1 | 5/2003 | Ylitalo et al. |
| 6,613,436 B2 | 9/2003 | Ambrose et al. |
| 6,875,800 B2 | 4/2005 | Vanier et al. |
| 6,894,086 B2 | 5/2005 | Munro et al. |
| 6,998,107 B2 | 2/2006 | Unger |
| 7,009,032 B2 | 3/2006 | Bojkova et al. |
| 7,097,883 B2 | 8/2006 | Sawant et al. |
| 7,247,596 B2 | 7/2007 | Jialanella et al. |
| 7,390,859 B2 | 6/2008 | Sawant et al. |
| 7,438,974 B2 | 10/2008 | Obuhowich |
| 7,455,804 B2 | 11/2008 | Patel et al. |
| 7,531,117 B2 | 5/2009 | Ederer et al. |
| 7,578,958 B2 | 8/2009 | Patel et al. |
| 7,767,130 B2 | 8/2010 | Elsner et al. |
| 7,875,666 B2 | 1/2011 | Gilmore et al. |
| 7,879,955 B2 | 2/2011 | Rao et al. |
| 7,888,436 B2 | 2/2011 | Szymanski et al. |
| 7,955,537 B2 | 6/2011 | Ederer et al. |
| 7,957,825 B2 | 6/2011 | Marsh et al. |
| 8,138,273 B2 | 3/2012 | Rao et al. |
| 8,426,112 B2 | 4/2013 | Nakajima et al. |
| 8,466,220 B2 | 6/2013 | Rao et al. |
| 8,513,339 B1 | 8/2013 | Keledjian et al. |
| 8,535,463 B2 | 9/2013 | Allen et al. |
| 8,541,513 B2 | 9/2013 | Hobbs et al. |
| 8,729,216 B2 | 5/2014 | Hobbs et al. |
| 8,816,023 B2 | 8/2014 | Anderson et al. |
| 8,876,513 B2 | 11/2014 | Lim et al. |
| 8,883,392 B2 | 11/2014 | Napadensky et al. |
| 8,952,124 B2 | 2/2015 | Rao et al. |
| 8,993,691 B2 | 3/2015 | Anderson et al. |
| 9,079,833 B2 | 7/2015 | Klobes et al. |
| 9,122,819 B2 | 9/2015 | McDowell et al. |
| 9,216,547 B2 | 12/2015 | Elsey |
| 9,370,132 B2 | 6/2016 | Coppola |
| 9,382,640 B2 | 7/2016 | Yamagata |
| 9,422,451 B2 | 8/2016 | Rao et al. |
| 9,452,445 B2 | 9/2016 | Frankenberger |
| 9,533,798 B2 * | 1/2017 | Virnelson ............... C08G 75/12 |
| 9,540,540 B2 | 1/2017 | Rao et al. |
| 9,650,537 B2 | 5/2017 | Kunc et al. |
| 9,663,619 B2 | 5/2017 | Echigoya et al. |
| 9,676,159 B2 * | 6/2017 | Sterman ................. B33Y 80/00 |
| 9,708,440 B2 | 7/2017 | Das et al. |
| 9,744,720 B2 | 8/2017 | Napadensk |
| 9,796,858 B2 | 10/2017 | Powell et al. |
| 9,862,059 B2 | 1/2018 | Liebl et al. |
| 9,873,761 B1 | 1/2018 | Das et al. |
| 9,883,711 B2 | 2/2018 | McDowell et al. |
| 9,944,826 B2 | 4/2018 | Czaplewski et al. |
| 9,951,251 B2 | 4/2018 | Anderson et al. |
| 9,982,164 B2 | 5/2018 | Rolland et al. |
| 9,992,917 B2 | 6/2018 | Yanke et al. |
| 10,016,941 B1 | 7/2018 | Beard et al. |
| 10,059,595 B1 | 8/2018 | Farbstein |
| 10,071,350 B2 | 9/2018 | Lewis et al. |
| 10,074,449 B2 | 9/2018 | White et al. |
| 10,139,808 B2 | 11/2018 | Engelbart et al. |
| 10,174,781 B2 | 1/2019 | Zook et al. |
| 10,232,549 B2 | 3/2019 | Hayes et al. |
| 10,243,295 B2 | 3/2019 | Matlack et al. |
| 10,253,195 B2 | 4/2019 | Fenn et al. |
| 10,259,956 B2 | 4/2019 | Chopra et al. |
| 10,280,348 B2 | 5/2019 | Virnelson |
| 10,308,837 B2 | 6/2019 | Anderson et al. |
| 10,350,823 B2 | 7/2019 | Rolland et al. |
| 10,400,057 B2 | 9/2019 | Kwisnek et al. |
| 10,449,714 B2 | 10/2019 | Achten et al. |
| 10,464,031 B2 | 11/2019 | Lewis et al. |
| 10,538,031 B2 | 1/2020 | Chen et al. |
| 10,625,470 B2 | 4/2020 | Sun et al. |
| 10,639,842 B2 | 5/2020 | Leibig et al. |
| 10,639,844 B2 | 5/2020 | Rolland et al. |
| 10,683,381 B2 | 6/2020 | Abell et al. |
| 10,688,770 B2 | 6/2020 | Boydston et al. |
| 10,772,246 B2 | 9/2020 | Speaker et al. |
| 10,792,860 B2 | 10/2020 | Wantanabe et al. |
| 10,932,399 B1 | 2/2021 | Nowak et al. |
| 10,947,969 B2 | 3/2021 | Overend et al. |
| 10,948,082 B2 | 3/2021 | Delong et al. |
| 10,968,340 B1 | 4/2021 | Mapkar et al. |
| 11,192,632 B2 | 12/2021 | Dovey |
| 11,209,084 B2 | 12/2021 | Dovey |
| 11,269,311 B2 * | 3/2022 | Teng .................... B33Y 40/20 |
| 2001/0043990 A1 | 11/2001 | Chong et al. |
| 2002/0007015 A1 | 1/2002 | DeMoss et al. |
| 2002/0013450 A1 | 1/2002 | Zook et al. |
| 2002/0122928 A1 | 9/2002 | Botrie et al. |

(56) References Cited

U.S. PATENT DOCUMENTS

| | | |
|---|---|---|
| 2002/0182339 A1 | 12/2002 | Taylor et al. |
| 2003/0004599 A1 | 1/2003 | Herbak |
| 2003/0176578 A1 | 9/2003 | Zook et al. |
| 2003/0199655 A1 | 10/2003 | Yurugi et al. |
| 2004/0039121 A1 | 2/2004 | Zook et al. |
| 2004/0097643 A1 | 5/2004 | Bons et al. |
| 2004/0189311 A1 | 9/2004 | Glezer et al. |
| 2004/0220327 A1 | 11/2004 | Cosman et al. |
| 2004/0247792 A1 | 12/2004 | Sawant et al. |
| 2005/0001003 A1 | 1/2005 | Nayrac et al. |
| 2005/0171237 A1 | 8/2005 | Patel et al. |
| 2005/0270796 A1 | 12/2005 | Ichikawa et al. |
| 2005/0287348 A1 | 12/2005 | Faler et al. |
| 2005/0287354 A1 | 12/2005 | Jennings et al. |
| 2006/0046068 A1 | 3/2006 | Barancyk et al. |
| 2006/0100307 A1 | 5/2006 | Uerz et al. |
| 2006/0108450 A1 | 5/2006 | Klinkenberg et al. |
| 2006/0251896 A1 | 11/2006 | Ferencz et al. |
| 2006/0252881 A1 | 11/2006 | DeSaw et al. |
| 2006/0270796 A1 | 11/2006 | Sawant et al. |
| 2007/0141267 A1 | 6/2007 | Sonnenschein et al. |
| 2007/0142605 A1 | 6/2007 | Bojkova et al. |
| 2007/0149725 A1 | 6/2007 | Christensen et al. |
| 2009/0047531 A1 | 2/2009 | Bartley et al. |
| 2009/0065357 A1 | 3/2009 | Glezer et al. |
| 2009/0126225 A1 | 5/2009 | Jarvis |
| 2009/0289015 A1 | 11/2009 | Matsukawa et al. |
| 2009/0296002 A1 | 12/2009 | Lida et al. |
| 2010/0041839 A1 | 2/2010 | Anderson et al. |
| 2010/0076143 A1 | 3/2010 | Yakulis et al. |
| 2010/0113252 A1 | 5/2010 | Bordia et al. |
| 2010/0130687 A1 | 5/2010 | Tu et al. |
| 2010/0234485 A1 | 9/2010 | Kohli et al. |
| 2010/0286307 A1 | 11/2010 | Anderson et al. |
| 2012/0040103 A1 | 2/2012 | Keledjian et al. |
| 2012/0040104 A1 | 2/2012 | Keledjian et al. |
| 2012/0117822 A1 | 5/2012 | Jarvis |
| 2012/0159785 A1 | 6/2012 | Pyles et al. |
| 2012/0244337 A1 | 9/2012 | Gavin |
| 2012/0313056 A1 | 12/2012 | Baran et al. |
| 2013/0034571 A1 | 2/2013 | Murphy et al. |
| 2013/0073073 A1 | 3/2013 | Pettis |
| 2013/0095253 A1 | 4/2013 | Lindsay et al. |
| 2013/0196124 A1 | 8/2013 | Flores et al. |
| 2013/0237661 A1 | 9/2013 | Brust et al. |
| 2013/0253084 A1 | 9/2013 | Duggal et al. |
| 2013/0271526 A1 | 10/2013 | Ciampini et al. |
| 2013/0284359 A1 | 10/2013 | Virnelson |
| 2013/0302575 A1 | 11/2013 | Moegele et al. |
| 2013/0344340 A1 | 12/2013 | Senkfor et al. |
| 2013/0345372 A1 | 12/2013 | Blackford et al. |
| 2014/0012406 A1 | 1/2014 | Cioffi et al. |
| 2014/0017460 A1 | 1/2014 | Xu et al. |
| 2014/0110881 A1 | 4/2014 | Keledjian et al. |
| 2014/0186543 A1 | 7/2014 | Keledjian et al. |
| 2014/0220354 A1 | 8/2014 | Gao et al. |
| 2014/0272287 A1 | 9/2014 | Cai et al. |
| 2014/0323647 A1 | 10/2014 | Voit et al. |
| 2014/0331520 A1 | 11/2014 | Yakulis et al. |
| 2015/0014881 A1 | 1/2015 | Elsey |
| 2015/0026629 A1* | 1/2015 | Kushler ............ G06F 3/04886 715/773 |
| 2015/0307738 A1 | 10/2015 | Schmucker et al. |
| 2015/0321434 A1 | 11/2015 | Sterman et al. |
| 2016/0009029 A1 | 1/2016 | Cohen et al. |
| 2016/0039145 A1 | 2/2016 | Steiner |
| 2016/0083619 A1 | 3/2016 | Anderson et al. |
| 2016/0090507 A1 | 3/2016 | Keledjian et al. |
| 2016/0107391 A1 | 4/2016 | Parish et al. |
| 2016/0152775 A1 | 6/2016 | Tobis et al. |
| 2016/0167299 A1 | 6/2016 | Jallouli et al. |
| 2016/0244980 A1 | 8/2016 | Urban et al. |
| 2016/0250688 A1 | 9/2016 | Coppola |
| 2016/0257067 A1 | 9/2016 | Boydston et al. |
| 2016/0271872 A1 | 9/2016 | Sand |
| 2016/0271878 A1 | 9/2016 | Nuechterlein et al. |
| 2016/0297104 A1 | 10/2016 | Guillemette et al. |
| 2016/0332382 A1 | 11/2016 | Coward et al. |
| 2016/0333152 A1 | 11/2016 | Cook et al. |
| 2016/0374428 A1 | 12/2016 | Kormann et al. |
| 2017/0057160 A1 | 3/2017 | Duty et al. |
| 2017/0066196 A1 | 3/2017 | Beard et al. |
| 2017/0114208 A1 | 4/2017 | Rao et al. |
| 2017/0145202 A1 | 5/2017 | Sparks et al. |
| 2017/0246802 A1 | 8/2017 | Pyzik et al. |
| 2017/0266691 A1 | 9/2017 | Travis |
| 2017/0266877 A1 | 9/2017 | Tyler |
| 2017/0291357 A1 | 10/2017 | Fong et al. |
| 2017/0321083 A1* | 11/2017 | Fenn ................ C08G 18/3228 |
| 2017/0341296 A1 | 11/2017 | Fenn et al. |
| 2017/0361549 A1 | 12/2017 | Swan et al. |
| 2017/0369620 A1 | 12/2017 | Abell et al. |
| 2017/0369737 A1 | 12/2017 | Cui et al. |
| 2018/0029291 A1 | 2/2018 | Matzner et al. |
| 2018/0056582 A1 | 3/2018 | Matusik et al. |
| 2018/0059541 A1 | 3/2018 | Campbell et al. |
| 2018/0086002 A1 | 3/2018 | Sun et al. |
| 2018/0100075 A1 | 4/2018 | Chopra et al. |
| 2018/0133952 A1 | 5/2018 | Gu et al. |
| 2018/0133953 A1 | 5/2018 | Achten et al. |
| 2018/0133954 A1 | 5/2018 | Watanabe et al. |
| 2018/0162981 A1 | 6/2018 | Achten et al. |
| 2018/0207863 A1 | 7/2018 | Porter et al. |
| 2018/0215854 A1 | 8/2018 | Paranthaman et al. |
| 2018/0223795 A1 | 8/2018 | Tobin et al. |
| 2018/0244854 A1 | 8/2018 | Drazba et al. |
| 2018/0264719 A1 | 9/2018 | Rolland et al. |
| 2018/0362784 A1 | 12/2018 | Gorin et al. |
| 2019/0001553 A1 | 1/2019 | Robeson et al. |
| 2019/0010370 A1 | 1/2019 | Lin et al. |
| 2019/0030795 A1 | 1/2019 | Jiang et al. |
| 2019/0037969 A1 | 2/2019 | Busbee et al. |
| 2019/0040204 A1 | 2/2019 | Beyer et al. |
| 2019/0118497 A1 | 4/2019 | Kierbel et al. |
| 2019/0152133 A1 | 5/2019 | Busbee |
| 2019/0162223 A1* | 5/2019 | Burock ............... B29C 31/044 |
| 2019/0176998 A1 | 6/2019 | Renwick et al. |
| 2019/0217536 A1 | 7/2019 | Honorato et al. |
| 2019/0248065 A1 | 8/2019 | Gorin et al. |
| 2019/0276689 A1 | 9/2019 | Dhoble et al. |
| 2019/0358983 A1 | 11/2019 | Busbee et al. |
| 2020/0131385 A1 | 4/2020 | Bartow et al. |
| 2020/0164572 A1 | 5/2020 | Bartow et al. |
| 2020/0180220 A1 | 6/2020 | Nelson et al. |
| 2020/0217332 A1 | 7/2020 | Mohr et al. |
| 2020/0276797 A1 | 9/2020 | Zdrojek et al. |
| 2020/0312782 A1 | 10/2020 | Eid et al. |
| 2021/0008793 A1 | 1/2021 | Pokrass et al. |
| 2021/0139445 A1* | 5/2021 | Takeda ................ H10K 85/636 |
| 2022/0072762 A1* | 3/2022 | Chopra ................ B29C 64/393 |

FOREIGN PATENT DOCUMENTS

| | | |
|---|---|---|
| CN | 102896923 A | 1/2013 |
| CN | 104031383 A | 9/2014 |
| CN | 105313332 A | 2/2016 |
| CN | 107471629 A | 12/2017 |
| CN | 109041563 A | 12/2018 |
| CN | 109247005 A | 1/2019 |
| CN | 110628192 A | 12/2019 |
| CN | 111087792 A | 5/2020 |
| CN | 111391305 A | 7/2020 |
| CN | 111774561 A | 10/2020 |
| DE | 19937770 A1 | 2/2001 |
| DE | 102011003619 A1 | 8/2012 |
| DE | 102015220699 A1 | 3/2017 |
| EP | 0437374 B1 | 12/1996 |
| EP | 2416950 A1 | 2/2012 |
| EP | 2658702 A1 | 11/2013 |
| EP | 2719484 A1 | 4/2014 |
| EP | 2851208 A1 | 3/2015 |
| EP | 3059171 A1 | 8/2016 |
| EP | 3232071 A1 | 10/2017 |
| EP | 3550142 A1 | 10/2019 |

(56) References Cited

FOREIGN PATENT DOCUMENTS

| | | |
|---|---|---|
| EP | 3626442 A1 | 3/2020 |
| EP | 3626443 A1 | 3/2020 |
| FR | 3039553 A1 | 2/2017 |
| JP | H03-210364 A | 9/1991 |
| JP | H04-366617 A | 12/1992 |
| JP | 2001-089568 | 4/2001 |
| JP | 2001-518408 A | 10/2001 |
| JP | 2002-166460 A | 6/2002 |
| JP | 2003-506228 | 2/2003 |
| JP | 2004-326042 | 11/2004 |
| JP | 2006-008547 | 1/2006 |
| JP | 2010-513686 | 4/2010 |
| JP | 2011-105906 A | 6/2011 |
| JP | 5085800 B1 | 11/2012 |
| JP | 2013-136724 A | 7/2013 |
| JP | 2014-521797 A | 8/2014 |
| JP | 2015-512816 A | 4/2015 |
| JP | H06-026637 B2 | 11/2015 |
| JP | 2016-530430 A | 9/2016 |
| JP | 62-53354 B2 | 12/2017 |
| JP | 2018-002896 A | 1/2018 |
| JP | 2018-502197 A | 1/2018 |
| JP | 2019-504919 A | 2/2019 |
| KR | 101891560 A | 3/2018 |
| RU | 2003117463 | 12/2004 |
| RU | 2247087 C2 | 2/2005 |
| RU | 2263699 | 11/2005 |
| RU | 2332265 C2 | 8/2008 |
| RU | 2532190 C2 | 10/2014 |
| RU | 2014113527 A | 10/2015 |
| RU | 2015119379 | 12/2016 |
| RU | 2673840 C1 | 11/2018 |
| RU | 2677143 C1 | 1/2019 |
| TW | 201509698 A | 3/2015 |
| TW | 201821248 A | 6/2018 |
| WO | 98/39365 | 9/1998 |
| WO | 00/75221 | 12/2000 |
| WO | 01/07154 | 2/2001 |
| WO | 2001/010630 | 2/2001 |
| WO | 01/66622 | 9/2001 |
| WO | 01/66642 | 9/2001 |
| WO | 03/029665 | 4/2003 |
| WO | 2004/076852 | 9/2004 |
| WO | 2006/060272 | 6/2006 |
| WO | 2006/073695 | 7/2006 |
| WO | 2007/044735 | 4/2007 |
| WO | 2007/063001 | 6/2007 |
| WO | 2008/010706 | 1/2008 |
| WO | 2008/040508 | 4/2008 |
| WO | 2009/137197 | 12/2009 |
| WO | 2010/019561 | 2/2010 |
| WO | 2010/024904 A1 | 3/2010 |
| WO | 2012/021781 | 2/2012 |
| WO | 2012/021793 | 2/2012 |
| WO | 2013/091003 | 6/2013 |
| WO | 2014/066039 | 5/2014 |
| WO | 2015/147973 A1 | 10/2015 |
| WO | 2016/061060 A1 | 4/2016 |
| WO | 2016/085914 A1 | 6/2016 |
| WO | 2016/085976 A1 | 6/2016 |
| WO | 2016/085992 A1 | 6/2016 |
| WO | 2016/106352 A1 | 6/2016 |
| WO | 2016/149032 A1 | 9/2016 |
| WO | 2016/164562 A1 | 10/2016 |
| WO | 2016/182805 A1 | 11/2016 |
| WO | 2016/201103 A1 | 12/2016 |
| WO | 2017/087055 A1 | 5/2017 |
| WO | 2017/095658 A1 | 6/2017 |
| WO | 2017/112682 A1 | 6/2017 |
| WO | 2017/144461 A1 | 8/2017 |
| WO | 2018/005686 A1 | 1/2018 |
| WO | 2018/007579 A1 | 1/2018 |
| WO | 2017/130685 A1 | 2/2018 |
| WO | 2018/026829 A1 | 2/2018 |
| WO | 2018/031532 A1 | 2/2018 |
| WO | 2018/049038 A1 | 3/2018 |
| WO | WO-2018072034 A1 * | 4/2018 ........... B29C 64/106 |
| WO | 2018/085650 A1 | 5/2018 |
| WO | 2017/092764 A1 | 6/2018 |
| WO | 2018/106822 A1 | 6/2018 |
| WO | 2018/113875 A1 | 6/2018 |
| WO | 2018/157148 A1 | 8/2018 |
| WO | 2019/089235 A1 | 5/2019 |
| WO | 2019/173511 A1 | 9/2019 |
| WO | 2019/191509 A1 | 10/2019 |
| WO | 2019/204770 A1 | 10/2019 |
| WO | 2019/217848 A1 | 11/2019 |
| WO | 2019/224699 A1 | 11/2019 |
| WO | 2020/107365 A1 | 6/2020 |
| WO | 2020/147567 A1 | 7/2020 |
| WO | 2020/251661 A1 | 12/2020 |

OTHER PUBLICATIONS

Final Office Action for U.S. Appl. No. 14/963,976, mailed on Nov. 2, 2016, 8 pages.
International Search Report and Written Opinion for PCT Application No. PCT/US2018/016104, mailed on May 30, 2019, 8 pages.
International Search Report and Written Opinion for Application No. PCT/US2015/062297, mailed on Mar. 4, 2016, 10 pages.
International Search Report and Written Opinion for Application No. PCT/US2015/062445, mailed on Mar. 1, 2016, 10 pages.
International Search Report and Written Opinion for Application No. PCT/US2015/062412, mailed on Mar. 2, 2016, 9 pages.
International Search Report and Written Opinion for Application No. PCT/IB2018/056254, mailed on Nov. 19, 2018, 10 pages.
International Search Report and Written Opinion for Application No. PCT/US2019/026672, mailed on Jul. 25, 2019, 12 pages.
International Search Report and Written Opinion for Application No. PCT/US2020/017428, mailed on Jul. 29, 2020, 18 pages.
International Search Report and Written Opinion for Application No. PCT/US2020/017455, mailed on May 25, 2020, 11 pages.
International Search Report and Written Opinion for Application No. PCT/US2020/017464, mailed on May 25, 2020, 9 pages.
International Search Report and Written Opinion for Application No. PCT/US2020/039557, mailed on Oct. 8, 2020, 13 pages.
International Search Report and Written Opinion for Application No. PCT/US2020/017417, mailed on Jun. 12, 2020, 10 pages.
International Search Report and Written Opinion for Application No. PCT/US2020/017441, mailed on Jun. 22, 2020, 8 pages.
International Preliminary Report on Patentability for Application No. PCT/US2015/062297, mailed on May 30, 2017, 7 pages.
International Preliminary Report on Patentability for Application No. PCT/US2015/062445, mailed on May 30, 2017, 8 pages.
International Preliminary Report on Patentability for Application No. PCT/US2015/062412, mailed on May 30, 2017, 7 pages.
First Report for Australian Application No. 2015 353730, mailed on Mar. 15, 2018, 6 pages.
First Report for Australian Application No. 2015 353634, mailed on Mar. 5, 2018, 6 pages.
First Report for Australian Application No. 2015 353618, mailed on Sep. 21, 2017, 6 pages.
Canadian Office Action for Application No. 2,968,549, mailed on May 7, 2018, 4 pages.
Canadian Office Action for Application No. 2,968,670, mailed on Jun. 11, 2018, 3 pages.
Canadian Office Action for Application No. 2,968,538, mailed on Jun. 6, 2018, 4 pages.
Russia Office Action for Application No. 2017121858, mailed on May 16, 2018, 2 pages.
Russia Office Action for Application No. 2017122126, mailed on May 16, 2018, 4 pages.
Asif, M. et al., "A new photopolymer extrusion 5-axis 3D printer," Additive Manufacturing, 2018, vol. 23, p. 355-361.
Asif, M. et al., "A New 3D Printing Technique Using Extrusion of Photopolymer," Conference Paper, Jan. 2017, 11 pages.
"The Jeffaminer Polyetheramines," Huntsman, 2007, 6 pages.

(56) References Cited

OTHER PUBLICATIONS

Broekaert, "Polyurea Spray Coatings: The Technology and Latest Developments," Paint & Coatings Industry, Mar. 2002, 15 pages.
Caddy et al., "Photoactive Liquid Polysulfides: Preparation, characterization, photocuring and potential applications", European Polymer Journal, 2003, vol. 39, p. 461-487.
Formlabs White Paper: 3D Printing with Desktop Stereolithography, An Introduction for Professional Users, Jun. 2015, retrieved from https://archive-media.formlabs.com/upload/Intro-sla-whitepaper-04.pdf, 12 pages.
Hurlbert. "Visual perception: Learning to see through noise", Current Biology, Mar. 2000, vol. 10, No. 6, p. R231-R233.
Kade et al., "The Power of Thiol-ene Chemistry", Journal of Polymer Science: Part A, Polymer Chemistry, 2010, vol. 48, p. 743-750.
Kitano, H. et al., "Unexpected Visible-Light-Induced Free Radical Photopolymerization at Low Light Intensity and High Viscosity Using a Titanocene Photoinitiator," Journal of Applied Polymer Science, 2013, p. 611-618.
Koo et al., "Limitations of Radical Thiol-ene Reactions for Polymer-Polymer Conjugation", Journal of Polymer Science: Part A, Polymer Chemistry, 2010, vol. 48, p. 1699-1713.
Krober, P. et al., "Reactive inkjet printing of polyurethanes," Journal of Material Chemistry, 2009, vol. 19, p. 5234-5238.
Quadion LLC, Minnesota Rubber and Plastic, Thermoset Plastics vs Thermoplastics, https://www.mnrubber.com/Design_Guide/5-2.html, Oct. 25, 2014, accessed Nov. 7, 2019.
Rios, Orlando, "Evaluation of Advanced Polymers for Additive Manufacturing," CRADA Final Report NFE-14-05252, Oak Ridge National Laboratory, Sep. 8, 2017, 29 pages.
Smith, P. et al., "Reactive inkjet printing," Journal of Materials Chemistry, 2012, vol. 22, p. 10965-10970.
Viscosity of Water, retrieved from https://www.engineersedge.com/physics/water_density_viscosity_specific_weight_13146.htm, accessed Apr. 20, 2020, first published Jun. 25, 2014.
Zhu et al., "Water-based coatings for 3D printed parts", Journal of Coatings Technology and Research, Jul. 2015, vol. 12, No. 5, p. 889-897.
Universal Selector by SpecialChem, Desmophen® 550 U Technical Data Sheet—Supplied by Covestro, Mar. 4, 2021, 2 pages, http://coatings.specialchem.com.
Covestro Desmodur® VL Product Data Sheet, Sep. 1, 2015, 3 pages.
International Preliminary Report on Patentability received for PCT Patent Application No. PCT/US20/17441, mailed on Aug. 26, 2021, 7 pages.

* cited by examiner

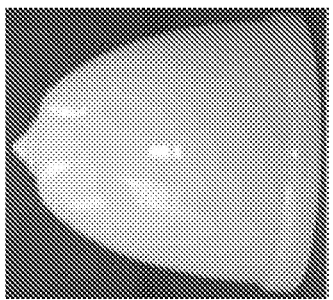
FIG. 3A
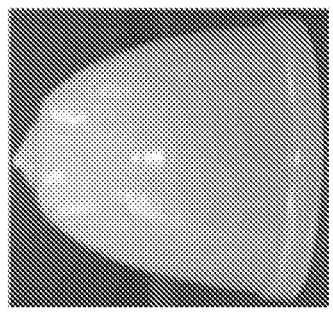
FIG. 3B
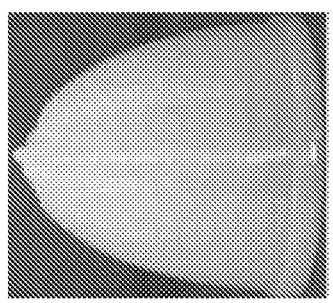
FIG. 3C
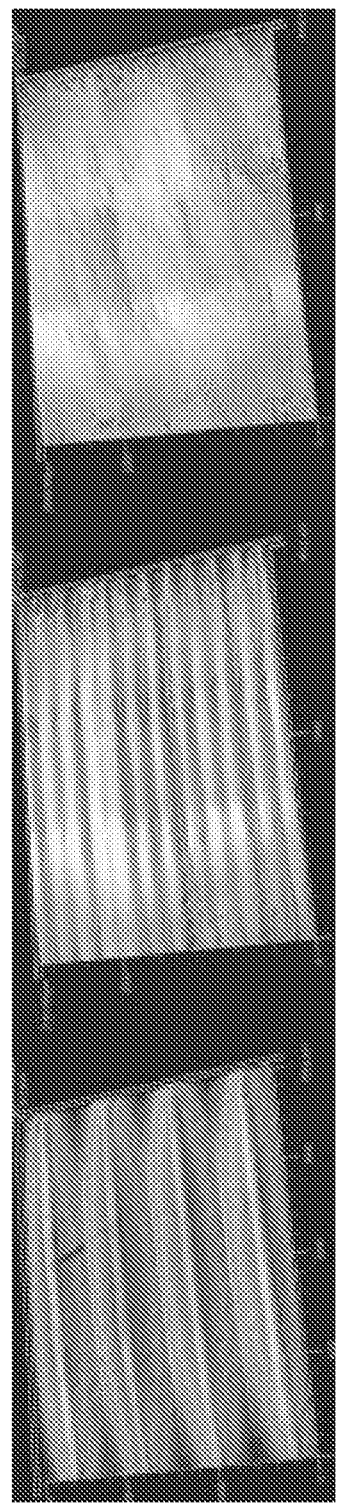
FIG. 3D
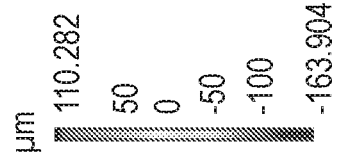

3D PRINTING OF SEAL CAPS

This application claims the benefit under 35 U.S.C. § 119(e) of U.S. Provisional Application No. 62/803,682 filed on Feb. 11, 2019, which is incorporated by reference in its entirety.

FIELD

The disclosure relates to methods of, sealing a fastener, fabricating seal caps and seal caps made according to such methods.

BACKGROUND

Seal caps are used to seal and protect fasteners from environmental conditions. Depending on the application it can be desirable that a seal cap exhibit one or more properties including chemical resistance, corrosion resistance, hydrolytic stability, low temperature flexibility, high temperature resistance, and the ability to dissipate electrical charge. Fasteners such as rivets, bolts, screws, nuts, anchors, and washers in various shapes and sizes are used to secure parts and can extend above surfaces to various degrees. It is useful to have seal caps in which the material and dimensions are optimized for particular applications.

SUMMARY

According to the present invention, methods of sealing a fastener comprise depositing successive layers comprising a first coreactive composition directly onto the fastener by three-dimensional printing.

According to the present invention, methods of fabricating a seal cap comprise depositing successive layers of a first coreactive composition by three-dimensional printing to form a seal cap shell defining an interior volume; and filling the interior volume with a second coreactive composition to provide a seal cap.

Seal caps made according to the present methods and sealed fasteners are also within the scope of the present invention.

BRIEF DESCRIPTION OF THE DRAWINGS

The drawings described herein are for illustration purposes only. The drawings are not intended to limit the scope of the present disclosure.

FIGS. 3A-3C show photographs of polyurea seal cap shells made according to methods provided by the present disclosure.

FIG. 3D shows confocal laser scanning microscopy surface profiles (10×) for the corresponding seal cap shells shown in FIGS. 3A-3C.

DETAILED DESCRIPTION

Figure 1A:
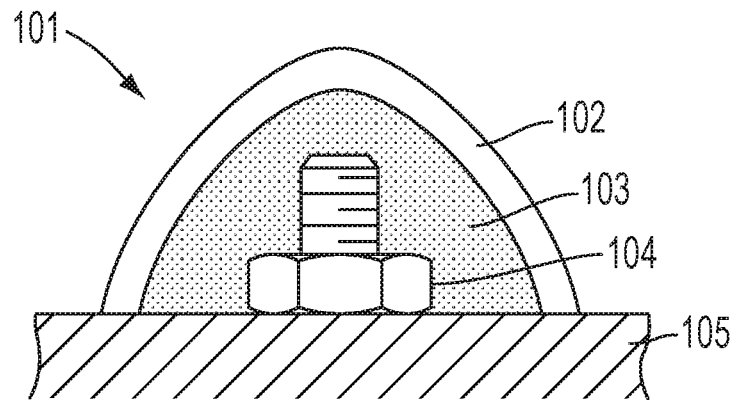
FIGS. 1A-1B show cross-sectional views of seal caps assembled over a fastener.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl ($-CH_2-$), ethane-1,2-diyl ($-CH_2CH_2-$), propane-1,3-diyl and iso-propane-1,2-diyl (e.g., $-CH_2CH_2CH_2-$ and $-CH(CH_3)CH_2-$), butane-1,4-diyl ($-CH_2CH_2CH_2CH_2-$), pentane-1,5-diyl ($-CH_2CH_2CH_2CH_2CH_2-$), hexane-1,6-diyl ($-CH_2CH_2CH_2CH_2CH_2CH_2-$), heptane-1,7-diyl, octane-1,8-diyl, nonane-1,9-diyl, decane-1,10-diyl, and dodecane-1,12-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be, for example, $C_{1-6}$, $C_{1-4}$, $C_{1-3}$, methyl, methanediyl, ethyl, or ethane-1,2-diyl. An alkanecycloalkane group can be, for example, $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be, for example, $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{6-18}$ alkanearene, $C_{6-16}$ alkanearene, $C_{6-12}$ alkanearene, $C_{6-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group can be, for example, $C_{6-18}$ alkanearenediyl, $C_{6-16}$ alkanearenediyl, $C_{6-12}$ alkanearenediyl, $C_{6-8}$ alkanearenediyl, $C_{6-12}$ alkanearenediyl, $C_{6-18}$ alkanearenediyl, or $C_{6-9}$ alkanearenediyl. Examples of alkanearenediyl groups include diphenyl methane-4,4'-diyl.

1 "Alkenyl" group refers to the structure $-CR=C(R)_2$ where the alkenyl group is a group and is bonded to a larger molecule. In such embodiments, each R may independently comprise, for example, hydrogen and $C_{1-3}$ alkyl. Each R can be hydrogen and an alkenyl group can have the structure $-CH=CH_2$.

"Alkoxy" refers to a $-OR$ group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. An alkyl group can be, for example, $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be, for example, $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be, for example, $C_{6-12}$ arenediyl, $C_{6-10}$ arenediyl, $C_{6-9}$ arenediyl, or benzene-diyl.

"Cycloalkanediyl" refers to a diradical saturated monocyclic or polycyclic hydrocarbon group. A cycloalkanediyl group can be, for example, $C_{3-12}$ cycloalkanediyl, $C_{3-8}$ cycloalkanediyl, $C_{6-12}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be, for example, $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can be N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can be N or O.

A "backbone" of a prepolymer refers to the segment between the reactive functional groups. A prepolymer backbone typically includes repeating subunits. For example, the backbone of a polythiol $HS-[R]_n-SH$ is $-[R]_n-$.

"A coreactive composition" refers to a composition comprising two or more coreactive compounds capable of reacting at a temperature, for example, less than 50° C., less than 40° C., less than 30° C., or less than 20° C. The reaction between the two or more compounds may be initiated by combining and mixing the two or more coreactive compounds and/or by exposing a coreactive composition comprising the two or more coreactive compounds to a suitable catalyst or a suitable activated polymerization initiator such as a photopolymerization initiator that is exposed to actinic radiation. A suitable catalyst and a suitable polymerization initiator are capable of accelerating or initiating a chemical reaction between the coreactive compounds. A catalyst can be a latent catalyst that can be activated by exposure to energy such as heat, actinic radiation or mechanical forces such as shear forces. A coreactive composition can be formed, for example, by combining and mixing a first reactive component comprising a first reactive compounds with a second reactive component comprising a second reactive compounds, wherein the first reactive compound can react with the second reactive compound.

A "core" of a compound or a polymer refers to the segment between the reactive functional groups. For example, the core of a polythiol $HS-R-SH$ will be $-R-$. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Cure time" refers to the duration from when the curing reaction of a coreactive composition is first initiated, for example, by combining and mixing to coreactive components to form the coreactive composition and/or by exposing a coreactive composition to actinic radiation, until a layer prepared from the coreactive composition exhibits a hardness of Shore 30A at conditions of 25° C. and 50% RH. For an actinic radiation-curable composition the cure time refers to the duration from when the coreactive composition is first exposed to actinic radiation to the time when a layer prepared from the exposed coreactive composition exhibits a hardness of Shore 30A at conditions of 25° C. and 50% RH.

During cure a coreactive composition can be characterized by a working time, a tack free time, an onset of cure, and full cure. Working time or gel time refers to the time from when reaction(s) between the constituents is initiated, for example, by mixing and/or be activating a polymerization initiator to when a coreactive composition is no longer stirrable by hand. The tack free time refers to the time from when the reaction(s) between the constituents are first initiated until a surface of the curing coreactive composition is no longer tack free. The time to onset of cure refers to the time from when the reaction(s) between the constituents are initiated until the time when the curing coreactive composition develops a measurable hardness. A time to full cure can refer to the time when the cured composition achieves a hardness within 90% of the maximum hardness. These times can vary considerably depending, for example, on the constituents of a coreactive composition, the curing chemistries, the temperature, the presence of catalysts, cure accelerators and/or photopolymerization initiators.

A dash ("—") that is not between two letters or symbols is used to indicate a point of bonding for a substituent or between two atoms. For example, —CONH$_2$ is attached through the carbon atom.

"Derived from" as in "a moiety derived from a compound" refers to a moiety that is generated upon reaction of a parent compound with a reactant. For example, a bis(alkenyl) compound CH$_2$=CH—R—CH=CH$_2$ can react with another compound such as a compound having thiol groups to produce the moiety —(CH$_2$)$_2$—R—(CH$_2$)$_2$—, which is derived from the reaction of the alkenyl groups with the thiol groups. As another example, for a parent diisocyanate having the structure O=C=N—R—N=C=O, a moiety derived from the diisocyanate has the structure —C(O)—NH—R—NH—C(O)—.

"Derived from the reaction of —V with a thiol" refers to a moiety —V'— that results from the reaction of a thiol group with a moiety comprising a functional group reactive with a thiol group. For example, a group V— can comprise CH$_2$=CH—CH$_2$—O—, where the alkenyl group CH$_2$=CH— is reactive with a thiol group —SH. Upon reaction with a thiol group, the moiety —V'— is —CH$_2$—CH$_2$—CH$_2$—O—.

Glass transition temperature T$_g$ is determined by dynamic mechanical analysis (DMA) using a TA Instruments Q800 apparatus with a frequency of 1 Hz, an amplitude of 20 microns, and a temperature ramp of –80° C. to 25° C., with the T$_g$ identified as the peak of the tan δ curve.

A monomer refers to a low molecular weight compound and can have a molecular weight, for example, less than 1,000 Da, less than 800 Da less than 600 Da, less than 500 Da, less than 400 Da, or less than 300 Da. A monomer can have a molecular weight, for example, from 100 Da to 1,000 Da, from 100 Da to 800 Da, from 100 Da to 600 Da, from 150 Da, to 550 Da, or from 200 Da to 500 Da. A monomer can have a molecular weight greater than 100 Da, greater than 200 Da, greater than 300 Da, greater than 400 Da, greater than 500 Da, greater than 600 Da, or greater than 800 Da. A monomer can have a reactive functionality of two or more, for example, from 2 to 6, from 2 to 5, or from 2 to 4. A monomer can have a functionality of 2, 3, 4, 5, 6, or a combination of any of the foregoing. A monomer can have an average reactive functionality, for example, from 2 to 6, from 2 to 5, from 2 to 4, from 2 to 3, from 2.1 to 2.8, or from 2.2 to 2.6. The reactive functionality refers to the number of reactive groups per molecule. A combination of compounds having a different reactive functionality can be characterized by an average non-integer reactive functionality.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

"Prepolymer" refers to homopolymers and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises a backbone and reactive functional groups capable of reacting with another compound such as a curing agent or crosslinker to form a cured polymer. A prepolymer includes multiple repeating subunits bonded to each other than can be the same or different. The multiple repeating subunits make up the backbone of the prepolymer.

A polyfunctionalizing agent can have the structure of Formula (1):

$$B(-V)_z \qquad (1)$$

where B is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=CH$_2$, where R can be, for example, C$_{2-10}$ alkanediyl, C$_{2-10}$ heteroalkanediyl, substituted C$_{2-10}$ alkanediyl, or substituted C$_{2-10}$ heteroalkanediyl. When the moiety V is reacted with another compound the moiety —V$^1$— results and is said to be derived from the reaction with the other compound. For example, when V is —R—CH=CH$_2$ and is reacted, for example, with a thiol group, the moiety V$^1$ is —R—CH$_2$—CH$_2$— is derived from the reaction.

Specific gravity is determined according to ISO 787-11.

Shore A hardness is measured using a Type A durometer in accordance with ASTM D2240.

"Substituted" refers to a group in which one or more hydrogen atoms are each independently replaced with the same or different substituent(s). A substituent can comprise halogen, —S(O)$_2$OH, —S(O)$_2$, —SH, —SR where R is C$_{1-6}$ alkyl, —COOH, —NO$_2$, —NR$_2$ where each R independently comprises hydrogen and C$_{1-3}$ alkyl, —CN, =O, C$_{1-10}$ alkyl, —CF$_3$, —OH, phenyl, C$_{2-6}$ heteroalkyl, C$_{5-6}$ heteroaryl, C$_{1-10}$ alkoxy, or —COR where R is C$_{1-10}$ alkyl. A substituent can be —OH, —NH$_2$, or C$_{1-10}$ alkyl.

"Tack free time" refers to the duration from the time when the curing reaction of a coreactive composition is first initiated to the time when a layer prepared from the coreactive composition is no longer tack free, where tack free is determined by applying a polyethylene sheet to the surface of the layer with hand pressure and observing whether sealant adheres to the surface of the polyethylene sheet, where the layer is considered to be tack free if the polyethylene sheet separates easily from the layer. For an actinic radiation-curable coreactive composition, the tack free time refers to the time from when the coreactive composition is exposed to actinic radiation to the time when a layer prepared from the coreactive composition is no longer tack free.

Tensile strength and elongation are measured according to AMS 3279.

"Transmissive" refers to the ability to transmit a portion of the electromagnetic spectrum within the range of 360 nm to 750 nm, of greater than 20%, greater than 30%, greater than 40%, or greater than 50% of the incident radiation.

Reference is now made to certain compounds, compositions, apparatus, and methods of the present invention. The disclosed compounds, compositions, apparatus, and methods are not intended to be limiting of the claims. To the contrary, the claims are intended to cover all alternatives, modifications, and equivalents.

Methods provided by the present disclosure comprise methods of fabricating seal caps using three-dimensional printing. Seal caps can be fabricated by depositing a coreactive composition directly onto a fastener using three-dimensional printing. The deposited coreactive composition forms a seal cap, and/or a seal cap shell can be applied over the coreactive composition deposited onto the faster to form a seal cap. A seal cap shell can be fabricating using three-dimensional printing. Seal caps can also be fabricated by depositing successive layers of a coreactive composition to form a seal cap shell, and filling the interior volume defined by the seal cap shell with an additional coreactive composition, which can be the same or different than the first coreactive composition. The seal cap including the seal cap shell and filled interior can then be assembled over a fastener to seal the fastener.

"Sealing a fastener" and like terms in the context of the present disclosure refers to the process by which a coreactive composition is placed over a fastener such that the coreactive composition conforms to the surfaces of the fastener, and after curing, provides a barrier that minimizes liquids such as water, solvents, and fuels, from contacting the fastener during the design life of the seal.

Figure 1B:
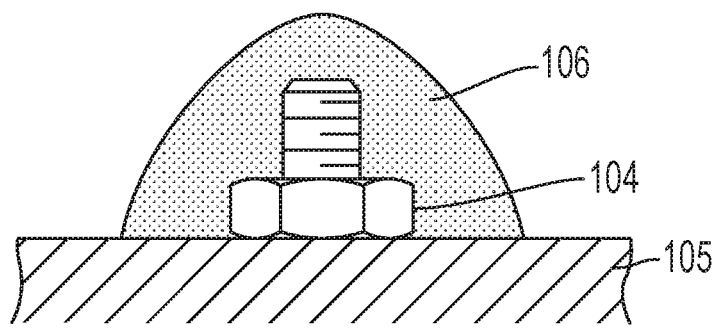

Seal caps are typically dome-shaped structures that fit over an extension of a fastener above a surface. A cross-sectional view of a seal cap and a fastener is shown in FIG. 1A and FIG. 1B. FIG. 1A shows a view of a seal cap 101, having an exterior layer forming a shell 102 and an interior layer 103 surrounding a fastener 104 mounted to a surface 105. FIG. 1B shows a view of another example of a seal cap having a single layer 106 surrounding fastener 104, which is mounted to surface 105.

Figure 2A:
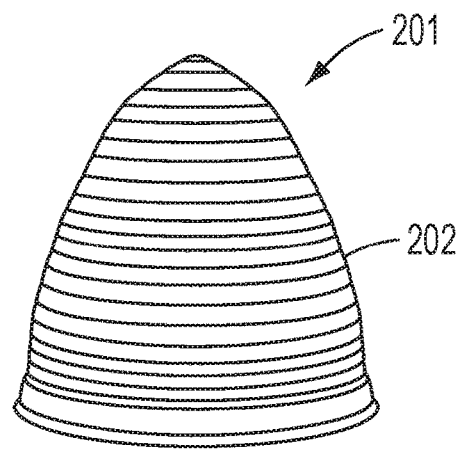
FIGS. 2A-2C show a perspective view of an exterior of a seal cap shell, a cross-sectional view of a seal cap shell and a cross-sectional view with a coreactive composition filling the interior volume of the shell, respectively.
Figure 2B:
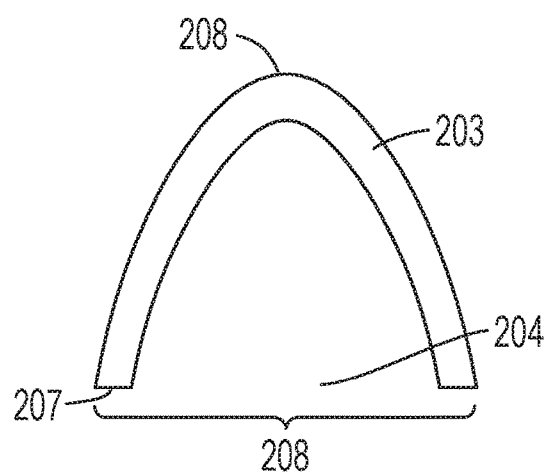
Figure 2C:
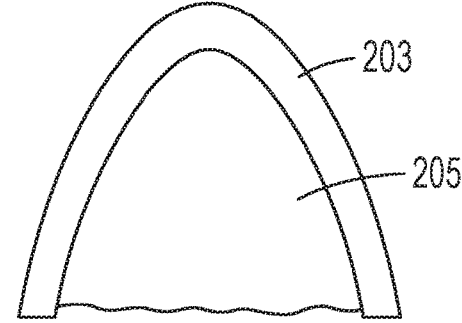

Views of a seal cap shell are shown in FIG. 2A-2C. FIG. 2A shows a perspective view of the exterior surface 202 of a seal cap shell 201. FIG. 2B shows a cross-sectional view of the exterior layer 203 of a seal cap shell, which defines an interior volume 204. As shown in FIG. 2C, the interior volume 204 can be filled with a coreactive composition 205 to fill the volume and is ready to be assembled onto a fastener.

To seal a fastener, the seal cap shown in FIG. 2C can be applied over a fastener before the interior coreactive composition 205 fully cures. The seal cap shell 203 can be at least partially cured to the extent that the seal cap shell retains coreactive composition 205 and such that the seal cap can be manually or robotically manipulated. The exterior surface of the seal cap shell can be at least partially cured or fully cured; and the interior surface of the seal cap shell can be at least partially uncured or fully uncured at the time of application to the fastener. The seal cap shell can also be fully cured before the seal cap is assembled over a fastener. The interior coreactive composition 205 can be uncured or at least partially uncured to the extent that the seal cap can be applied over a fastener and the interior coreactive composition 205 has a sufficiently low viscosity that the interior coreactive composition 205 conforms to the contours of the fastener and other assemblies such as bolts, washers and surfaces to cover the fastener to form a viable seal. It is typically desirable that the interior coreactive composition contact the surfaces of the fastener and substrate without any air gaps, voids, and/or bubbles. After the seal cap is assembled onto a fastener the seal cap shell and the interior coreactive composition can be fully cured, to the extent that the coreactive composition is not already fully cured, to seal the fastener.

A seal cap can have a dome shape with dimensions suitable to cover a particular fastener. For example, the width of the base (element 208 in FIG. 2B) of a seal cap can be, for example, from 5 mm to 60 mm, from 10 mm to 40 mm, or from 20 mm to 30 mm. The dimensions of the base of a seal cap can be, for example, greater than 5 mm, greater than 10 mm, greater than 20 mm, greater than 30 mm, or greater than 40 mm. The base of a seal cap can be, for example, less than 10 mm, less than 20 mm, less than 30 mm, less than 40 mm, or less than 50 mm. The height of a seal cap can be, for example, from 5 mm to 50 mm, from 10 mm to 40 mm or from 20 mm to 30 mm. The height of a seal cap can be, for example, greater than 5 mm, greater than 10 mm, greater than 20 mm, greater than 30 mm, greater than 40 mm, or greater than 50 mm. The height of a seal cap can be, for example, less than 10 mm, less than 20 mm, less than 30 mm, less than 40 mm, or less than 50 mm.

A seal cap shell can have an average thickness, for example, from 0.5 mm to 25 mm, from 1 mm to 20 mm, from 1.5 mm to 15 mm, or from 2 mm to 10 mm. A seal cap shell can have an average thickness (207), for example, greater than 0.5 mm, greater than 1 mm, greater than 2 mm, greater than 5 mm, greater than 10 mm, greater than 15 mm, or greater than 20 mm. A seal cap shell can have an average thickness, for example, less than 1 mm, less than 2 mm, less than 5 mm, less than 10 mm, less than 15 mm, or less than 20 mm.

A seal cap can be configured to seal a fastener from exposure to solvents such as fuel and hydraulic fluid during use. For example, it can be desirable that the surfaces of a fastener be covered with at least 5 mm of a cured solvent-resistant composition.

Seal caps provided by the present disclosure can be fabricated using three-dimensional printing. Three-dimensional printing includes a variety of robotic manufacturing methods in which processor-controlled robotic methods are used to form three-dimensional articles. Three-dimensional printing methods used to fabricate seal caps comprise depositing one or more coreactive compositions in successive layers to form a seal cap.

In a first method of fabricating a seal cap, successive layers of a first coreactive composition can be deposited directly onto a fastener and the deposited first coreactive composition allowed to cure in place on the fastener to form a seal cap.

A seal cap can be formed by depositing a first coreactive composition onto a fastener and subsequently depositing a second coreactive composition over the first coreactive composition to form a seal cap. Before depositing the second coreactive composition, the first coreactive composition can be fully cured, partially cured, or can remain uncured.

The first coreactive composition and the second coreactive composition can be deposited simultaneously, for example, by depositing the first and second coreactive compositions independently using separate printing nozzles, or by depositing the first and second coreactive compositions, and optional additional coreactive compositions, by coextrusion through a single coextrusion nozzle.

The first and second coreactive compositions can have the same curing chemistries or can have different curing chemistries. Each of the first coreactive composition and the second coreactive composition can independently comprise a compound capable of reacting with a compound in the other coreactive composition.

A coreactive composition can comprise a first compound having a first functional group and a second compound having a second functional group, wherein the functional groups react to form a cured polymer network. For coreactive compositions having the same curing chemistry, the first functional groups and the second functional groups will be the same in both of the coreactive compositions. For example, both the first and second coreactive compositions can be based on thiol/ene chemistry.

For coreactive compositions that do not have the same curing chemistries but comprise compounds capable of coreacting, the first functional groups in both coreactive compositions can be the same, and the second functional groups can be different and capable of coreacting with the first functional groups. As an example, the first functional groups can be thiol groups, and in the first coreactive composition the second functional group can be an alkenyl group, and in the second coreactive composition the second functional group can be an epoxy group. The second functional groups in the first and second coreactive compositions are different, but nevertheless capable of reacting with the common first functional groups, i.e., the thiol groups.

By selecting a first coreactive composition and a second coreactive composition that can coreact chemical bonding between the coreactants can take place during cure. Chemical bonding at the interface between the first and second coreactive compositions integrates the two coreactive compositions to provide a robust durable interface. Although chemical bonding can occur between cured and uncured coreactive compositions, it is desirable that the first and second coreactive compositions, or at least the portion of the coreactive compositions at the interface, remain uncured or at least partially uncured at the time they are initially brought together and then simultaneously cured to increase the extent of reaction between the compounds at the interface between the two coreactive compositions and thereby increase the chemical bonding between the adjacent coreactive compositions. Bonding between adjoining coreactive compositions can occur through physical methods such as by entanglement and/or migration of constituents between layers.

Seal caps fabricated by depositing one or more coreactive compositions directly onto a fastener using coreactive three-dimensional printing can minimize voids between the fastener and the coreactive composition. The curing chemistry and viscosity of a coreactive composition can be selected to flow around and conform to the complex geometry of a fastener and the three-dimensional printing process can be designed to continuously displace air that could otherwise be trapped between the fastener surfaces and the sealant. Coreactive three-dimensional printing can also facilitate the use of a wide range of curing chemistries and prepolymers that are not easily accessible using curing methods for fabricating a seal cap. For example, current methods of fabricating a seal cap can involve UV curing of sealant compositions. To facilitate UV-initiated curing the curing chemistry is typically based on a free radical polymerization reaction and the sealant compositions must be transmissive to allow the UV radiation to penetrate through the depth of the sealant. As a result, the curing chemistries and sealant compositions of UV-curable seal caps can be limited. As disclosed herein, the ability to fabricate seal caps having multiple layers in which desired properties of each layer are optimized to provide a certain function can provide seal caps with superior performance attributes compared to seal caps formed from a single composition. Furthermore, the use of coreactive compositions capable of coreacting and forming chemically bonded layers can provide strong interface integrity and thereby enhance the reliability of a three-dimensionally printed seal cap in the demanding aerospace use conditions. In addition, fabricating seal caps using three-dimensional printing to deposit sealant compositions directly onto a fastener avoids the logistics of storing preformed seal caps, which can come in many shapes and sizes. Directly fabricating seal caps in place using three-dimensional printing under semi-automated or fully automated control facilitates the ability of an operator to fabricate seal caps onto fasteners having many different shapes and sizes.

A seal cap can be fabricated by depositing a first coreactive composition directly onto a fastener using three-dimensional printing, applying a pre-fabricated seal cap shell over the deposited first coreactive composition, and curing the first coreactive composition and optionally the seal cap shell, as needed, to seal the fastener.

As with the first method, one or more coreactive compositions can be deposited directly onto a fastener either sequentially or simultaneously. A pre-formed seal cap shell can be fabricated using three-dimensional printing by depositing successive layers of a second coreactive composition or by other means. At least the exterior surface of the seal cap shell can be at least partially cured to facilitate handling. The interior surface of the seal cap shell can be partially cured or uncured to facilitate the ability of the first coreactive composition to chemically bond to the seal cap shell. The pre-formed seal cap shell can be fully cured. The pre-formed seal cap shell can comprise a second coreactive composition, which can be the same or different as the deposited coreactive composition, have the same or different curing chemistry as the deposited coreactive composition, be able to coreact with the deposited coreactive composition, or can be non-reactive with the deposited coreactive composition.

Methods of sealing a fastener provided by the present disclosure also include depositing successive layers of a first coreactive composition by three-dimensional printing to form a seal cap shell defining an interior volume; and filling the interior volume with a second coreactive composition to provide a seal cap, which can be secured over a fastener and cured to seal the fastener.

The first and second coreactive compositions can be the same or different and can have the same or different curing chemistries. The first and second coreactive compositions can be coreactive with each other or may not be coreactive.

The seal cap shell can be partially cured or fully cured at the time the interior volume is filled with the second coreactive composition. To facilitate chemical bonding between the seal cap shell and the second coreactive composition it can be desirable that at least the portion of the first coreactive composition forming the interior surface of the seal cap shell is not fully cured. Also, to facilitate chemical bonding between the seal cap shell and the second coreactive composition, the first coreactive composition can comprise compounds capable of reacting with compounds in the second coreactive composition.

Filling the interior volume of the seal cap with the second coreactive composition can comprise depositing the second coreactive composition into the interior volume using three-dimensional printing or other method such as extruding or filling using a spatula or other tool.

The second coreactive composition filling the interior volume of the seal cap can have a viscosity that facilitates the ability of the second coreactive composition to conform to the surfaces of the fastener an minimize if not eliminate voids or pockets. At the time the seal cap is placed over a fastener the second coreactive composition can be uncured or partially cured.

After being placed over a fastener, the seal cap shell and the interior second coreactive composition can be cured by any suitable methods as appropriate for the curing chemistries of the first and second coreactive compositions.

As a modification of this method, a seal cap can be fabricated by depositing successive layers of a coreactive three-dimensional printing to form a seal cap. In this method, the seal cap is fabricated as one-piece and without separate steps for fabricating the seal cap shell and filling the interior volume. In this method, the exterior surface of the seal cap can be partially cured or fully cured to facilitate handling and placement of the seal cap onto a fastener. The coreactive composition in the interior volume of the seal cap can remain uncured or partially uncured to facilitate the ability of the uncured coreactive composition to conform to and cover the fastener.

In this method, the exterior portion, intermediate portions, and/or the interior portion of the seal cap can comprise the same or different coreactive compositions, can have the same or different curing chemistries, and/or can be coreactive with other portions of the seal cap. For example, the exterior portion of the seal cap can have a fast cure rate and the interior portion can have a slow cure rate. Here, fast and slow cure rates refer to the relative cure rates of the different portions of a seal cap. For example, the exterior portion of the seal cap can have a shorter working time or gel time and a short tack free time compared to that of an interior portion of the seal cap. Having the exterior portion of the seal cap set can facilitate the ability of the seal cap to retain a shape and handling. A slower curing rate for an interior portion of a seal cap can allow time for material properties to fully develop. As another example, the exterior surface can rapidly cure upon exposure to actinic radiation to facilitate handling of the seal cap.

A pre-fabricated seal cap can be applied to a fastener that comprises one or more layers of a three-dimensionally printed material. The printed material can conform to the complex surfaces of a fastener and provide conformal or smooth surface to which the pre-fabricated seal cap can be applied. By using coreactive compositions, the bonding between the layers can be enhanced.

A coreactive composition for fabricating the seal cap, the seal cap shell, and/or for filling the interior volume can comprise prepolymers having any suitable backbone, prepolymers having any suitable reactive functional groups, coreactive compounds based on any suitable curing chemistry, and/or any suitable additives.

A first and second coreactive composition can comprise, for example, prepolymers having the same or different prepolymer backbones, prepolymers having the same or different reactive functional groups, coreactive compounds having the same or different curing chemistry, coreactive compounds having different curing rates, and/or the same or different additives. For example, the first and second coreactive compositions can comprise different types of constituents and/or different amounts of constituents. For example, the first coreactive composition can comprise a first wt % of one or more constituents, and the second coreactive composition can comprise a second wt % of one or more constituents, where the first wt % is the same or different than the second wt % for at least one of the constituents, and wt % is based on the total weight of the respective coreactive composition.

As another example, the first coreactive composition can comprise a first vol % of one or more constituents, and the second coreactive composition can comprise a second vol % of one or more constituents, where the first vol % is the same or different than the second vol % for at least one of the constituents, and wt % is based on the total volume of the respective coreactive composition.

Similarly, when cured, the first and second coreactive compositions can have the same or different material properties including, for example, solvent resistance, physical properties, and/or specific gravity.

A first and second coreactive composition can comprise compounds capable of reacting with compounds in the other coreactive composition.

A coreactive composition can comprise a first compound having a first functional group and a second compound comprising a second functional group where the first functional group is reactive with the second functional group. The first and second compound can independently comprise a monomer, a combination of monomers, a prepolymer, a combination of prepolymers, or a combination thereof.

A coreactive composition can comprise, for example, a one-part coreactive composition in which the reaction between the coreactive compounds is initiated by exposure to energy such as by exposure to actinic radiation.

A coreactive composition can be formed by combining and mixing a first coreactive component comprising a first compound having a first functional group and a second coreactive component comprising a second compound having a second functional group, where the first and functional group is reactive with the second functional group.

A coreactive composition can comprise coreactive compounds capable of reacting at a temperature less than 50° C., such as less than 40° C., less than 30° C., less than 20° C., or less than 10° C. without exposure to actinic radiation or following exposure to actinic radiation. For example, the coreactive compounds can react a temperature from 5° C. to 50° C., from 10° C. to 40° C., or from 15° C. to 25° C., or from 20° C. to 30° C. A coreactive composition can comprise coreactive compounds that coreact and cure at room temperature, where room temperature refers to a temperature from 20° C. to 25° C., from 20° C. to 22° C., or about 20° C.

A coreactive composition have a viscosity at 25° C. and a shear rate at 0.1 $sec^{-1}$ to 100 $sec^{-1}$, for example, from 200 cP to 50,000,000 cP, from 200 cP to 20,000,000 cP, from 1,000 cP to 18,000,000 cP, from 5,000 cP to 15,000,000 cP, from 5,000 cP to 10,000,000 cP, from 5,000 cP to 5,000,000 cP, from 5,000 cP to 1,000,000 cP, from 5,000 cP to 100,000 cP, from 5,000 cP to 50,000 cP, from 5,000 cP to 20,000 cP, from 6,000 cP to 15,000 cP, from 7,000 cP to 13,000 cP, or from 8,000 cP to 12,000 cP. A coreactive composition have a viscosity at 25° C. and a shear rate at 0.1 $sec^{-1}$ to 100 $sec^{-1}$, for example, greater than 200 cP, greater than 1,000 cP, greater than 10,000 cP, greater than 100,000 cP, greater than 1,000,000 cP, or greater than 10,000,000 cP. A coreactive composition have a viscosity at 25° C. and a shear rate at 0.1 $sec^{-1}$ to 100 $sec^{-1}$, for example, less than 100,000,000 cP, less than 10,000,000 cP, less than 1,000,000 cP, less than 100,000 cp, less than 10,000 cP, or less than 1,000 cP. Viscosity values are measured using an Anton Paar MCR 302 rheometer with a gap from 1 mm at a temperature of 25° C. and a shear rate of 100 sec-1.

A coreactive composition can be formulated as a sealant composition that forms a sealant upon cure.

A sealant refers to a material that has the ability to resist atmospheric conditions, such as moisture and temperature and/or at least partially block the transmission of materials, such as water, solvent, fuel, hydraulic fluid and other liquids and gasses. A sealant can exhibit chemical resistance such as resistance to fuels and hydraulic fluids. A chemically resistant material can exhibit, for example, a % swell less than 25%, less than 20%, less than 15%, or less than 10% following immersion in the chemical for 7 days at 70° C. as determined according to EN ISO 10563. A sealant can exhibit resistance to Jet Reference Fluid (JRF) Type I, or to Skydrol® LD-40 hydraulic fluid.

In can be desirable that the outer portion of a seal cap such as a seal cap shell or the outer portion of a multilayer seal cap comprise a sealant. The outer portion of the seal cap exposed to the environment can serve as a solvent-resistant barrier. The inner portion of the seal cap adjacent a fastener may or may not comprise a sealant formulation. The inner portion of a seal cap, depending on the design, can comprise a cured coreactive composition deposited directly onto the fastener, or can comprise a cured coreactive composition that is deposited into the interior volume of a seal cap shell, which is then assembled onto the fastener.

The outer portion of a seal cap can comprise a first sealant and the inner portion can comprise a second sealant, where the first and second sealants can be the same or different.

A prepolymer used in a coreactive composition provided by the present disclosure can have a number average molecular weight, for example, less than 20,000 Da, less than 15,000 Da, less than 10,000 Da, less than 8,000 Da, less than 6,000 Da, less than 4,000 Da, or less than 2,000 Da. A prepolymer can have a number average molecular weight, for example, greater than 2,000 Da, greater than 4,000 Da, greater than 6,000 Da, greater than 8,000 Da, greater than 10,000 Da, or greater than 15,000 Da. A prepolymer can have a number average molecular weight, for example, from 1,000 Da to 20,000 Da, from 2,000 Da to 10,000 Da, from 3,000 Da to 9,000 Da, from 4,000 Da to 8,000 Da, or from 5,000 Da to 7,000 Da.

A prepolymer used in a coreactive composition provided by the present disclosure can be liquid at 25° C. and can have a glass transition temperature Tg, for example, less than −20° C., less than −30° C., or less than −40° C.

A prepolymer used in a coreactive composition provided by the present disclosure can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec) at 25° C.

A coreactive composition can comprise a prepolymer having any suitable polymeric backbone. A polymeric backbone can be selected, for example, to impart solvent resistance to the cured coreactive composition, to impart desired physical properties such as tensile strength, % elongation, Youngs modulus, impact resistance, or other application-relevant property. A prepolymer backbone can be terminated in one or more suitable functional groups as appropriate for a particular curing chemistry.

For example, a prepolymer backbone can comprise a polythioether, a polysulfide, a polyformal, a polyisocyanate, a polyurea, polycarbonate, polyphenylene sulfide, polyethylene oxide, polystyrene, acrylonitrile-butadiene-styrene, polycarbonate, styrene acrylonitrile, poly(methylmethacrylate), polyvinylchloride, polybutadiene, polybutylene terephthalate, poly(p-phenyleneoxide), polysulfone, polyethersulfone, polyethylenimine, polyphenylsulfone, acrylonitrile styrene acrylate, polyethylene, syndiotactic or isotactic polypropylene, polylactic acid, polyamide, ethyl-vinyl acetate homopolymer or copolymer, polyurethane, copolymers of ethylene, copolymers of propylene, impact copolymers of propylene, polyetheretherketone, polyoxymethylene, syndiotactic polystyrene (SPS), polyphenylene sulfide (PPS), liquid crystalline polymer (LCP), homo- and copolymer of butene, homo- and copolymers of hexene; and combinations of any of the foregoing.

Examples of other suitable prepolymer backbones include polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral), poly (methyl methacrylate) and other acrylate polymers and copolymers (including such as methyl methacrylate polymers, methacrylate copolymers, polymers derived from one or more acrylates, methacrylates, ethyl acrylates, ethyl methacrylates, butyl acrylates, butyl methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), polycarbonates (PC), polyamides, polyesters, liquid crystalline polymers (LCPs), poly(lactic acid), poly(phenylene oxide) (PPO), PPO-polyamide alloys, polysulfone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), and poly(vinyl chloride), polyurethanes (thermoplastic and thermosetting), aramides (such as Kevlar® and Nomex®), polytetrafluoroethylene (PTFE), polysiloxanes (including polydimethylenesiloxane, dimethylsiloxane/vinylmethylsiloxane copolymers, vinyldimethylsiloxane terminated poly (dimethylsiloxane)), elastomers, epoxy polymers, polyureas, alkyds, cellulosic polymers (such as ethyl cellulose, ethyl hydroxyethyl cellulose, carboxymethyl cellulose, cellulose acetate, cellulose acetate propionates, and cellulose acetate butyrates), polyethers and glycols such as poly (ethylene oxide)s (also known as poly(ethylene glycol)s, poly(propylene oxide)s (also known as poly(propylene glycol)s, and ethylene oxide/propylene oxide copolymers, acrylic latex polymers, polyester acrylate oligomers and polymers, polyester diol diacrylate polymers, and UV-curable resins.

A coreactive composition can comprise a prepolymer comprising an elastomeric backbone.

"Elastomer," "elastomeric" and the like refer to a material with "rubber-like" property and generally having a low Young's modulus and a high tensile strain. Elastomers can have a tensile strain (elongation at break) from about 100% to about 2,000%. Elastomers can exhibit a tear strength, for example, from 50 kN/m to 200 kN/m as determined according to ASTM D624. The Young's modulus of an elastomer can range, for example, from 0.5 MPa to 30 MPa, such as from 1 MPa to 6 MPa as determined according to ASTM D412.4893.

Examples of suitable prepolymers having an elastomeric backbone include polyethers, polybutadienes, fluoroelastomers, perfluoroelastomers, ethylene/acrylic copolymers, ethylene propylene diene terpolymers, nitriles, polythiolamines, polysiloxanes, chlorosulfonated polyethylene rubbers, isoprenes, neoprenes, polysulfides, polythioethers, silicones, styrene butadienes, and combinations of any of the foregoing. An elastomeric prepolymer can comprise a polysiloxane, such as, for example, a polymethylhydrosiloxane, polydimethylsiloxane, polyethylhydrosiloxane, polydiethylsiloxane, or a combination of any of the foregoing. The elastomeric prepolymer can comprise functional groups that have a low reactivity with amine and isocyanate groups such as silanol groups.

A coreactive composition can comprise a sulfur-containing prepolymer or combinations of sulfur-containing prepolymers. Sulfur-containing prepolymers can impart fuel resistance to a cured sealant.

A "sulfur-containing prepolymer" refers to a prepolymer that has one or more thioether —$S_n$— groups, where n can be, for example, 1 to 6, in the backbone of the prepolymer. Prepolymers that contain only thiol or other sulfur-containing groups either as terminal groups or as pendent groups of the prepolymer are not encompassed by sulfur-containing prepolymers. The prepolymer backbone refers to the portion of the prepolymer having repeating segments. Thus, a prepolymer having the structure of HS—R—R(—$CH_2$—SH)—[—R—($CH_2$)$_2$—S(O)($CH_2$)—S(O)$_2$]$_n$—CH=$CH_2$ where each R is a moiety that does not contain a sulfur atom, is not encompassed by a sulfur-containing prepolymer. A prepolymer having the structure HS—R—R(—$CH_2$—SH)—[—R—($CH_2$)$_2$—S(O)$_2$—($CH_2$)—S(O)$_2$]—CH=$CH_2$ where at least one R is a moiety that contains a sulfur atom without any sulfur-containing moieties, such as a thioether group, is encompassed by a sulfur-containing prepolymer.

Sulfur-containing prepolymers having a high sulfur content can impart chemical resistance to a cured coreactive composition. For example, a sulfur-containing prepolymer backbone can have a sulfur content greater than 10 wt %, greater than 12 wt %, greater than 15 wt %, greater than 18 wt %, greater than 20 wt %, or greater than 25 wt %, where wt % is based on the total weight of the prepolymer backbone. A chemically resistant prepolymer backbone can have a sulfur content, for example, from 10 wt % to 25 wt %, from 12 wt % to 23 wt %, from 13 wt % to 20 wt %, or from 14 wt % to 18 wt %, where wt % is based on the total weight of the prepolymer backbone.

Coreactive compositions can comprise, for example, from 40 wt % to 80 wt %, from 40 wt % to 75 wt %, from 45 wt % to 70 wt %, or from 50 wt % to 70 wt % of a sulfur-containing prepolymer or combination of sulfur-containing prepolymers, where wt % is based on the total weight of the coreactive composition. A coreactive composition can comprise, for example, greater than 40 wt %, greater than 50 wt %, greater than 60 wt %, greater than 70 wt %, greater than 80 wt %, or greater than 90 wt % of a sulfur-containing prepolymer or combination of sulfur-containing prepolymer, where wt % is based on the total weight of the coreactive composition. A coreactive composition can comprise, for example, less than 90 wt %, less than 80 wt %, less than 70 wt %, less than 60 wt %, less than 50 wt %, or less than 40 wt % of a sulfur-containing prepolymer or combination of sulfur-containing prepolymers, where wt % is based on the total weight of the coreactive composition.

Examples of prepolymers having a sulfur-containing backbone include polythioether prepolymers, polysulfide prepolymers, sulfur-containing polyformal prepolymers, monosulfide prepolymers, and a combination of any of the foregoing.

A coreactive composition can comprise a polythioether prepolymer or a combination of polythioether prepolymers.

A polythioether prepolymer can comprise a polythioether prepolymer comprising at least one moiety having the structure of Formula (2), a thiol-terminated polythioether prepolymer of Formula (2a), a terminal-modified polythioether of Formula (2b), or a combination of any of the foregoing:

  (2)

  (2a)

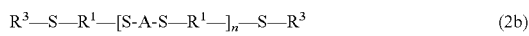  (2b)

wherein, n can be an integer from 1 to 60;

each $R^3$ can independently be moiety comprising a terminal reactive group;

each $R^1$ can independently be selected from $C_{2\text{-}10}$ alkanediyl, $C_{6\text{-}8}$ cycloalkanediyl, $C_{6\text{-}14}$ alkanecycloalkanediyl, $C_{5\text{-}8}$ heterocycloalkanediyl, and —[(CHR)$_p$—X-]$_q$(CHR)$_r$—, where, p can be an integer from 2 to 6;

q can be an integer from 1 to 5;

r can be an integer from 2 to 10;

each R can independently be selected from hydrogen and methyl; and each X can independently be selected from O, S, and S—S; and each A can independently be a moiety derived from a polyvinyl ether of Formula (3) and a polyalkenyl polyfunctionalizing agent of Formula (4):

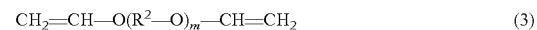  (3)

  (4)

wherein, m can be an integer from 0 to 50;

each $R^2$ can independently be selected from $C_{1\text{-}10}$ alkanediyl, $C_{6\text{-}8}$ cycloalkanediyl, $C_{6\text{-}14}$ alkanecycloalkanediyl, and —[(CHR)$_p$—X-]$_q$(CHR)$_r$—, wherein p, q, r, R, and X are as defined as for $R^1$;

B represents a core of a z-valent, polyalkenyl polyfunctionalizing agent B(—$R^7$—CH=$CH_2$)$_z$ wherein, z can be an integer from 3 to 6; and each $R^4$ can independently be selected from $C_{1\text{-}10}$ alkanediyl, $C_{1\text{-}10}$ heteroalkanediyl, substituted $C_{1\text{-}10}$ alkanediyl, and substituted $C_{1\text{-}10}$ heteroalkanediyl.

In moieties of Formula (2) and prepolymers of Formula (2a) and (2b), $R^1$ can be $C_{2\text{-}10}$ alkanediyl.

In moieties of Formula (2) and prepolymers of Formula (2a) and (2b), $R^1$ can be —[(CHR)$_p$—X-]$_q$(CHR)$_r$—.

In moieties of Formula (2) and prepolymers of Formula (2a) and (2b), X can be selected from O and S, and thus —[(CHR)$_p$—X-]$_q$(CHR)$_r$— can be —[(CHR)$_p$—O-]$_q$(CHR)$_r$— or —[(CHR)$_p$—S-]$_q$(CHR)$_r$—. P and r can be equal, such as where p and r can both be two.

In moieties of Formula (2) and prepolymers of Formula (2a) and (2b), $R^1$ can be selected from $C_{2\text{-}6}$ alkanediyl and —[(CHR)$_p$—X-]$_q$(CHR)$_r$—.

In moieties of Formula (2) and prepolymers of Formula (2a) and (2b), $R^1$ can be —[(CHR)$_p$—X-]$_q$(CHR)$_r$—, and X can be O, or X can be S.

In moieties of Formula (2) and prepolymers of Formula (2a) and (2b), where $R^1$ can be —[(CHR)$_p$—X-]$_q$(CHR)$_r$—, p can be 2, r can be 2, q can be 1, and X can be S; or p can be 2, q can be 2, r can be 2, and X can be O; or p can be 2, r can be 2, q can be 1, and X can be O.

In moieties of Formula (2) and prepolymers of Formula (2a) and (2b), $R^1$ can be —[(CHR)$_p$—X-]$_q$(CHR)$_r$—, each R can be hydrogen, or at least one R can be methyl.

In moieties of Formula (2) and prepolymers of Formula (2a) and (2b), $R^1$ can be —[($CH_2$)$_p$—X-]$_q$($CH_2$)$_r$— wherein each X can independently be selected from O and S.

In moieties of Formula (2) and prepolymers of Formula (2a) and (2b), $R^1$ can be —[($CH_2$)$_p$—X-]$_q$($CH_2$)$_r$— each X can be O or each X can be S.

In moieties of Formula 2) and prepolymers of Formula (2a) and (2b), $R^1$ can be —[($CH_2$)$_p$—X-]$_q$($CH_2$)$_r$—, where p can be 2, X can be O, q can be 2, r can be 2, $R^2$ can be ethanediyl, m can be 2, and n can be 9.

In moieties of Formula (2) and prepolymers of Formula (2a) and (2b), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In moieties of Formula (2) and prepolymers of Formula (2a) and (2b), each p can independently be selected from 2, 3, 4, 5, and 6. Each p can be the same and can be 2, 3, 4, 5, or 6.

In moieties of Formula (2) and prepolymers of Formula (2a) and (2b), each q can independently be 1, 2, 3, 4, or 5. Each q can be the same and can be 1, 2, 3, 4, or 5.

In moieties of Formula (2) and prepolymers of Formula (2a) and (2b), each r can independently be 2, 3, 4, 5, 6, 7, 8, 9, or 10. Each r can be the same and can be 2, 3, 4, 5, 6, 7, 8, 9, or 10.

In moieties of Formula (2) and prepolymers of Formula (2a) and (2b), each r can independently be an integer from 2 to 4, from 2 to 6, or from 2 to 8.

In divinyl ethers of Formula (3), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (3), each $R^2$ can independently be selected from a $C_{2-10}$ n-alkanediyl group, a $C_{3-6}$ branched alkanediyl group, and a —$[(CH_2)_p$—X-$]_q(CH_2)_r$— group.

In divinyl ethers of Formula (3), each $R^2$ can independently be a $C_{2-10}$ n-alkanediyl group, such as methanediyl, ethanediyl, n-propanediyl, or n-butanediyl.

In divinyl ethers of Formula (3), each $R^2$ can independently comprise a —$[(CH_2)_p$—X-$]_q(CH_2)_r$— group, where each X can be O or S.

In divinyl ethers of Formula (3), each $R^2$ can independently comprise a —$[(CH_2)_p$—X-$]_q(CH_2)_r$— group.

In divinyl ethers of Formula (3), each m can be independently an integer from 1 to 3. Each m can be the same and can be 1, 2, or 3.

In divinyl ethers of Formula (3), each $R^2$ can independently be selected from a $C_{2-10}$ n-alkanediyl group, a $C_3$ branched alkanediyl group, and a —$[(CH_2)_p$—X-$]_q(CH_2)_r$— group.

In divinyl ethers of Formula (3), each $R^2$ can independently be a $C_{2-10}$ n-alkanediyl group.

In divinyl ethers of Formula (3), each $R^2$ can independently be a —$[(CH_2)_p$—X-$]_q(CH_2)_r$— group, where each X can be O or S.

In divinyl ethers of Formula (3), each $R^2$ can independently be a —$[(CH_2)_p$—X-$]_q(CH_2)_r$— group, where each X can be O or S, and each p can independently be 2, 3, 4, 5, and 6.

In divinyl ethers of Formula (3), each p can be the same and can be 2, 3, 4, 5, or 6.

In divinyl ethers of Formula (3), each $R^2$ can independently be a —$[(CH_2)_p$—X-$]_q(CH_2)_r$— group, where each X can be O or S, and each q can independently be 1, 2, 3, 4, or 5.

In divinyl ethers of Formula (3), each q can be the same and can be 1, 2, 3, 4, or 5.

In divinyl ethers of Formula (3), each $R^2$ can independently be a —$[(CH_2)_p$—X-$]_q(CH_2)_r$— group, where each X can be O or S, and each r can independently be 2, 3, 4, 5, 6, 7, 8, 9, or 10.

In divinyl ethers of Formula (3), each r can be the same and can be 2, 3, 4, 5, 6, 7, 8, 9, or 10. In divinyl ethers of Formula (3), each r can independently be an integer from 2 to 4, from 2 to 6, or from 2 to 8.

Examples of suitable divinyl ethers include ethylene glycol divinyl ether (EG-DVE butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650.

In moieties of Formula (3) each A can independently be derived from a polyalkenyl polyfunctionalizing agent. A polyalkenyl polyfunctionalizing agent can have the structure of Formula (4), where z can be 3, 4, 5, or 6.

In polyalkenyl polyfunctionalizing agents of Formula (4), each $R^4$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3,5-triallyl-1,3,5-triazinane-2,4,6-trione), 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (2) and prepolymers of Formula (2a)-(2b), the molar ratio of moieties derived from a divinyl ether to moieties derived from a polyalkenyl polyfunctionalizing agent can be, for example, from 0.9 mol % to 0.999 mol %, from 0.95 mol % to 0.99 mol %, or from 0.96 mol % to 0.99 mol %.

In moieties of Formula (2) and prepolymers of Formula (2a)-(2b), each $R^1$ can be —$(CH_2)_2$—O—$(CH_2)_2$—O—$(CH_2)_2$—; each $R^2$ can be —$(CH_2)_2$—; and m can be an integer from 1 to 4.

In moieties of Formula (2) and prepolymers of Formula (2a)-(2b), $R^2$ can be derived from a divinyl ether such a diethylene glycol divinyl ether, a polyalkenyl polyfunctionalizing agent such as triallyl cyanurate, or a combination thereof.

In moieties of Formula (2) and prepolymers of Formula (2a)-(2b), each A can independently be selected from a moiety of Formula (3a) and a moiety of Formula (4a):

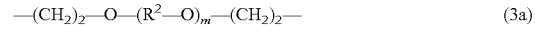

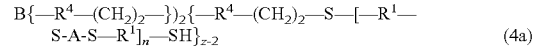

where m, $R^1$, $R^2$, $R^4$, A, B, m, n, and z are defined as in Formula (2), Formula (3), and Formula (4).

In moieties of Formula (3) and prepolymers of Formula (2a)-(2b),
each $R^1$ can be —$(CH_2)_2$—O—$(CH_2)_2$—O—$(CH_2)_2$—; each $R^2$ can be —$(CH_2)_2$—; m can be an integer from 1 to 4; and the polyfunctionalizing agent B(—R$^4$—CH═CH$_2$)$_z$ comprises triallyl cyanurate where z is 3 and each R is —O—CH$_2$—CH═CH$_2$.

Methods of synthesizing sulfur-containing polythioethers are disclosed, for example, in U.S. Pat. No. 6,172,179.

The backbone of a thiol-terminated polythioether prepolymer can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing). Polythioether prepolymers include prepolymers described in U.S. Application Publication Nos. 2017/0369737 and 2016/0090507.

Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (2), (2a), and (2b). Thiol-terminated polythioethers include prepolymers described in U.S. Pat. No. 7,390,859 and urethane-containing polythiols described in U.S. Application Publication Nos. 2017/0369757 and 2016/0090507.

A sulfur-containing prepolymer can comprise a polysulfide prepolymer or a combination of polysulfide prepolymers.

A polysulfide prepolymer refers to a prepolymer that contains one or more polysulfide linkages, i.e., —S$_x$— linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include Thioplast® G polysulfides such as Thioplast® G1, Thioplast® G4, Thioplast® G10, Thioplast® G12, Thioplast® G21, Thioplast® G22, Thioplast® G44, Thioplast® G122, and Thioplast® G131, which are commercially available from AkzoNobel. Suitable thiol-terminated polysulfide prepolymers, such as Thioplast® G resins, are liquid thiol-terminated polysulfide prepolymers that are blends of di- and tri-functional molecules where the difunctional thiol-terminated polysulfide prepolymers have the structure of Formula (5) and the trifunctional thiol-terminated polysulfide polymers can have the structure of Formula (6):

  (5)

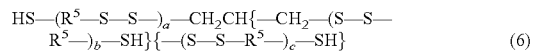  (6)

where each R$^5$ is —(CH$_2$)$_2$—O—CH$_2$—O—(CH$_2$)$_2$—, and d=a+b+c, where the value for d may be from 7 to 38 depending on the amount of the trifunctional cross-linking agent (1,2,3-trichloropropane; TCP) used during synthesis of the polysulfide prepolymer. Thioplast® G polysulfides can have a number average molecular weight from less than 1,000 Da to 6,500 Da, an SH content from 1% to greater than 5.5/6, and a cross-linking density from 0% to 2.0%.

Polysulfide prepolymers can further comprise a terminal-modified polysulfide prepolymer having the structure of Formula (5a), a terminal-modified polysulfide prepolymer having the structure of Formula (6a), or a combination thereof:

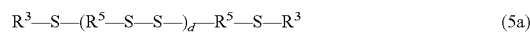  (5a)

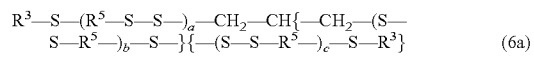  (6a)

where d, a, b, c, and R$^5$ are defined as for Formula (6) and Formula (7), and R$^3$ is a moiety comprising a terminal reactive group.

Examples of suitable thiol-terminated polysulfide prepolymers also include Thiokol® LP polysulfides available from Toray Industries, Inc. such as Thiokol® LP2, Thiokol® LP3, Thiokol™ LP12, Thiokol® LP23, Thiokol® LP33, and Thiokol® LP55. Thiokol® LP polysulfides have a number average molecular weight from 1,000 Da to 7,500 Da, a —SH content from 0.8% to 7.7%, and a cross-linking density from 0% to 2%. Thiokol™ LP polysulfide prepolymers have the structure of Formula (7) and terminal-modified polysulfide prepolymers can have the structure of Formula (7a):

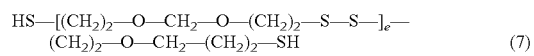  (7)

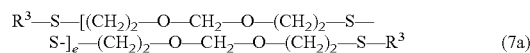  (7a)

where e can be such that the number average molecular weight from 1,000 Da to 7,500 Da, such as, for example an integer from 8 to 80, and each R$^6$ is a moiety comprising a terminal reactive functional group.

A thiol-terminated sulfur-containing prepolymer can comprise a Thiokol-LP® polysulfide, a Thioplast® G polysulfide, or a combination thereof.

A polysulfide prepolymer can comprise a polysulfide prepolymer comprising a moiety of Formula (7), a thiol-terminated polysulfide prepolymer of Formula (7a), a terminal-modified polysulfide prepolymer of Formula (7b), or a combination of any of the foregoing:

  (7)

  (7a)

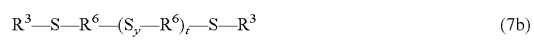  (7b)

where, t can be an integer from 1 to 60;

y can have an average value within a range from 1.0 to 1.5;

each R can independently be selected from branched alkanediyl, branched arenediyl, and a moiety having the structure —(CH$_2$)$_p$—O—(CH$_2$)$_q$—O—(CH$_2$)$_r$—, wherein,
q can be an integer from 1 to 8;
p can be an integer from 1 to 10; and
r can be an integer from 1 to 10; and
each R$^3$ is a moiety comprising a terminal reactive functional group.

In moieties of Formula (7) and prepolymers of Formula (7a)-(7b), 0% to 20% of the R groups can comprise branched alkanediyl or branched arenediyl, and 80% to 100% of the R$^6$ groups can be —(CH$_2$)$_p$—O—(CH$_2$)$_q$—O—(CH$_2$)$_r$—.

In moieties of Formula (7) and prepolymers of Formula (7a)-(7b), a branched alkanediyl or a branched arenediyl can be —R(-A)$_f$, where R is a hydrocarbon group, f is 1 or 2, and A is a branching point. A branched alkanediyl can have the structure —CH$_2$(—CH(—CH$_2$—)—)—.

Examples of thiol-terminated polysulfide prepolymers of Formula (7a) and (7b) are disclosed, for example, in U.S. Application Publication No. 2016/0152775, in U.S. Pat. No. 9,079,833, and in U.S. Pat. No. 9,663,619.

A sulfur-containing prepolymer can comprise a sulfur-containing polyformal prepolymer or a combination of sulfur-containing polyformal prepolymers. Sulfur-containing polyformal prepolymers useful in sealant applications are disclosed, for example, in U.S. Pat. No. 8,729,216 and in U.S. Pat. No. 8,541,513.

A polysulfide prepolymer can comprise a polysulfide prepolymer comprising a moiety of Formula (8), a thiol-terminated polysulfide prepolymer of Formula (8a), a terminal-modified polysulfide prepolymer of Formula (8b), or a combination of any of the foregoing:

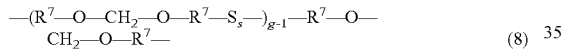  (8)

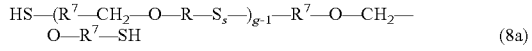  (8a)

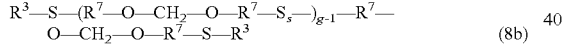  (8b)

where R$^7$ is C$_{2-4}$ alkanediyl, s is an integer from 1 to 8, and g is an integer from 2 to 370; and each R$^3$ is independently a moiety comprising a terminal reactive functional group.

In moieties of Formula (8) and prepolymers of Formula (8a)-(8b), are disclosed, for example, in JP 62-53354.

A sulfur-containing polyformal prepolymer can comprise a moiety of Formula (9), a thiol-terminated sulfur-containing polyformal prepolymer of Formula (9a), a terminal-modified sulfur-containing polyformal prepolymer of Formula (9b), a thiol-terminated sulfur-containing polyformal prepolymer of Formula (9c), a terminal-modified sulfur-containing polyformal prepolymer of Formula (9d), or a combination of any of the foregoing:

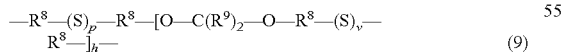  (9)

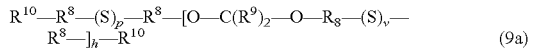  (9a)

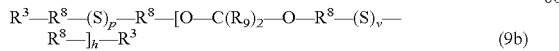  (9b)

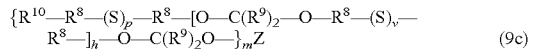  (9c)

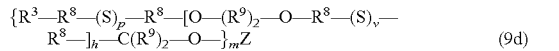  (9d)

where h can be an integer from 1 to 50; each v can independently be selected from 1 and 2; each R$^8$ can be C$_{2-6}$ alkanediyl; and each R$^9$ can independently be selected from hydrogen, C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl; each R$^{10}$ is a moiety comprising a terminal thiol group; and each R$^3$ is independently a moiety comprising a terminal reactive functional group other than a thiol group; and Z can be derived from the core of an m-valent parent polyol Z(OH)$_m$.

A sulfur-containing prepolymer can comprise a monosulfide prepolymer or a combination of monosulfide prepolymers.

A monosulfide prepolymer can comprise a moiety of Formula (10), a thiol-terminated monosulfide prepolymer of Formula (10a), a thiol-terminated monosulfide prepolymer of Formula (10b), a terminal-modified monosulfide prepolymer of Formula (10c), a terminal-modified monosulfide prepolymer of Formula (10d), or a combination of any of the foregoing:

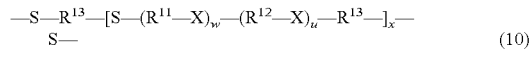  (10)

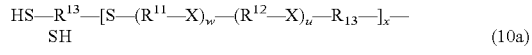  (10a)

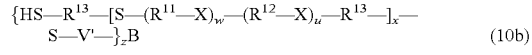  (10b)

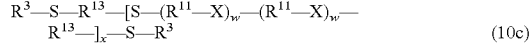  (10c)

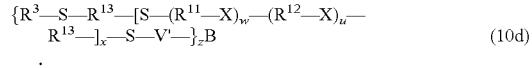  (10d)

wherein,
each R$^{11}$ can independently be selected from C$_{2-10}$ alkanediyl, such as C$_{2-6}$ alkanediyl; C$_{2-10}$ branched alkanediyl, such as C$_{3-6}$ branched alkanediyl or a C$_{3-6}$ branched alkanediyl having one or more pendant groups which can be, for example, alkyl groups, such as methyl or ethyl groups; C$_{6-8}$ cycloalkanediyl; C$_{6-14}$ alkylcycloalkyanediyl, such as C$_{6-10}$ alkylcycloalkanediyl; and C$_{8-10}$ alkylarenediyl;
each R$^{12}$ can independently be selected from hydrogen, C$_{1-10}$ n-alkanediyl, such as C$_{1-6}$ n-alkanediyl, C$_{2-10}$ branched alkanediyl, such as C$_{3-6}$ branched alkanediyl having one or more pendant groups which can be, for example, alkyl groups, such as methyl or ethyl groups; C$_{6-8}$ cycloalkanediyl; C$_{6-14}$ alkylcycloalkanediyl, such as C$_{6-10}$ alkylcycloalkanediyl; and C$_{8-10}$ alkylarenediyl;
each R$^{13}$ can independently be selected from hydrogen, C$_{1-10}$ n-alkanediyl, such as C$_{1-6}$ n-alkanediyl, C$_{2-10}$ branched alkanediyl, such as C$_{3-6}$ branched alkanediyl having one or more pendant groups which can be, for example, alkyl groups, such as methyl or ethyl groups; C$_{6-8}$ cycloalkanediyl group; C$_{6-14}$ alkylcycloalkanediyl, such as a C$_{6-10}$ alkylcycloalkanediyl; and C$_{8-10}$ alkylarenediyl;
each X can independently be selected from O and S;
w can be an integer from 1 to 5;
u can be an integer from 0 to 5; and
x can be an integer from 1 to 60, such as from 2 to 60, from 3 to 60, or from 25 to 35;
each R$^3$ is independently selected from a reactive functional group;
B represents a core of a z-valent polyfunctionalizing agent B(—V)$_z$ wherein:

z can be an integer from 3 to 6; and
each V can be a moiety comprising a terminal group reactive with a thiol group;
each —V'— can be derived from the reaction of —V with a thiol.

Methods of synthesizing thiol-terminated monosulfide comprising moieties of Formula (10) or prepolymers of Formula (10b)-(10c) are disclosed, for example, in U.S. Pat. No. 7,875,666.

A monosulfide prepolymer can comprise a moiety of Formula (11), a thiol-terminated monosulfide prepolymer comprising a moiety of Formula (11a), comprise a thiol-terminated monosulfide prepolymer of Formula (11b), a thiol-terminated monosulfide prepolymer of Formula (11c), a thiol-terminated monosulfide prepolymer of Formula (11d), or a combination of any of the foregoing:

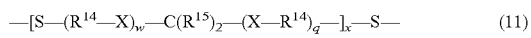

$$—[S—(R^{14}—X)_w—C(R^{15})_2—(X—R^{14})_q—]_x—S—  \quad (11)$$

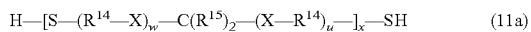

$$H—[S—(R^{14}—X)_w—C(R^{15})_2—(X—R^{14})_u—]_x—SH \quad (11a)$$

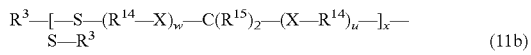

$$R^3—[—S—(R^{14}—X)_w—C(R^{15})_2—(X—R^{14})_u—]_x—S—R^3 \quad (11b)$$

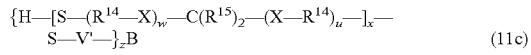

$$\{H—[S—(R^{14}—X)_w—C(R^{15})_2—(X—R^{14})_u—]_x—S—V'—\}_z B \quad (11c)$$

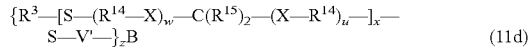

$$\{R^3—[S—(R^{14}—X)_w—C(R^{15})_2—(X—R^{14})_u—]_x—S—V'—\}_z B \quad (11d)$$

wherein,
each $R^4$ can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^{15}$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{8-10}$ alkylarenediyl;

each X can independently be selected from O and S;
w can be an integer from 1 to 5;
u can be an integer from 1 to 5;
x can be an integer from 1 to 60, such as from 2 to 60, from 3 to 60, or from 25 to 35;
each $R^3$ is a moiety comprising a terminal functional group;
B represents a core of a z-valent polyfunctionalizing agent $B(—V)_z$ wherein:
z can be an integer from 3 to 6; and
each V can be a moiety comprising a terminal group reactive with a thiol group;
each —V'— can be derived from the reaction of —V with a thiol.

Methods of synthesizing monosulfides of Formula (11)-(11d) are disclosed, for example, in U.S. Pat. No. 8,466,220.

A coreactive composition can comprise coreactive compounds having any suitable coreactive functional groups.

A first co-reactive compound can comprise one or more first functional groups and the second co-reactive compound can comprise one or more second functional groups, where the one or more first functional groups are reactive with the one or more second functional groups.

A functional group or combination of functional groups can be selected to achieve, for example, a desired curing rate. For example, to facilitate handling it can be desirable that the outer portion of a seal cap have a fast cure rate to facilitate handling. Other portions of a seal can have a slow cure rate to allow development of surface adhesion, adhesion between coreactive compositions, and/or desired physical properties.

For example, a first functional group can comprise a thiol group, and a second functional group can comprise a thiol group, an alkenyl group, an alkynyl group, an epoxy group, a Michael acceptor group, an isocyanate group, or a combination of any of the foregoing.

A first functional group can comprise, for example, an isocyanate and a second functional group can comprise a hydroxyl group, an amine group, a thiol group, or a combination of any of the foregoing.

A first functional group can comprise, for example, an epoxy group and a second functional group can comprise an epoxy group.

A first functional group can comprise, for example, a Michael acceptor group and a second functional group can comprise a Michael donor group.

A first functional group can comprise, for example, a carboxylic acid group and the second functional group can comprise an epoxy group.

A first functional group can comprise, for example, a cyclic carbonate group, an acetoacetate group, or an epoxy group; and the second functional group can comprise a primary amine group, or a secondary amine group.

A first functional group can comprise a Michael acceptor group such as (meth)acrylate group, a cyanoacrylate, a vinylether a vinylpyridine, or an α,β-unsaturated carbonyl group and the second functional group can comprise a malonate group, an acetylacetonate, a nitroalkane, or other active alkenyl group.

A first functional group can comprise an amine and a second functional group can comprise selected from an epoxy group, an isocyanate group, an acrylonitrile, a carboxylic acid including esters and anhydrides, an aldehyde, or a ketone.

Suitable coreactive functional groups are described, for example, in Noomen, Proceedings of the XIIIth International Conference in Organic Coatings Science and Technology, Athens, 1987, page 251; and in Tillet et al., *Progress in Polymer Science*, 36 (2011), 191-217.

Functional groups can be selected to coreact at temperatures, for example, less than 50° C., less than 40° C., less than 30° C., less than 20° C., or less than 10° C. Functional groups can be selected to coreact at temperatures, for example, greater than 5° C., greater than 10° C., greater than 20° C., greater than 30° C., or greater than 40° C. Functional groups can be selected to coreact, for example, at temperatures from 5° C. to 50° C., from 10° C. to 40° C., from 15° C., to 35° C., or from 20° C. to 30° C.

The cure rate for any of these coreactive chemistries can be modified by including an appropriate catalyst or combination of catalysts in a coreactive composition. The cure rate for any of these coreactive chemistries can be modified by increasing or decreasing the temperature of the coreactive composition. For example, although a coreactive composition can cure at temperatures less than 30° C., heating the coreactive composition can accelerate the reaction rate, which can be desirable under certain circumstances such as to accommodate an increased printing speed. Increasing the temperature of the coreactive components and/or the coreactive composition can also serve to adjust the viscosity to facilitate mixing the coreactive components and/or depositing the coreactive composition.

A coreactive composition can comprise coreactive compounds capable of coreacting at a temperature less than 50° C. without exposure to actinic radiation and can optionally include a catalyst.

For example, a coreactive composition can comprise compounds such as monomers and/or prepolymers comprising coreactive functional groups including, for example, any of those disclosed herein.

A coreactive composition can further include a suitable catalyst or combination of catalysts for catalyzing the reaction between the coreactive compounds.

A coreactive composition can be an actinic radiation-curable coreactive composition in which the curing reaction between the coreactive compounds in the coreactive composition is initiated by exposing the coreactive composition to actinic radiation.

Actinic radiation includes α-rays, γ-rays, X-rays, ultraviolet (UV) radiation (200 nm to 400 nm) such as UV-A radiation (320 nm to 400 nm), UV-B radiation (280 nm to 320 nm), and UV-C radiation (200 nm to 280 nm); visible radiation (400 nm to 770 nm), radiation in the blue wavelength range (450 nm to 490 nm), infrared radiation (>700 nm), near-infrared radiation (0.75 µm to 1.4 µm), and electron beams.

A radiation-curable coreactive composition can comprise compounds capable of coreacting by a free radical mechanism. Examples of free radical curing reactions include thiol/alkenyl reactions and thiol/alkynyl reactions.

A radiation curable coreactive composition can comprise any suitable free-radical polymerization initiator or combination of suitable free-radical polymerization initiators. Examples of free-radical polymerization initiators include photoinitiators, thermally activated free radical generators, cationic free radical generators and dark cure free radical generators.

A radiation-curable coreactive composition can comprise a photoinitiator such as a visible photoinitiator or a UV photoinitiator.

A radiation-curable coreactive composition can comprise a thermally activated free radical generator.

A radiation-curable coreactive composition can comprise a cationic free radical generator.

A radiation-curable coreactive composition can comprise a dark cure free radical generator.

The free radical photopolymerization reaction can be initiated by exposing a coreactive composition to actinic radiation such as UV radiation, for example, for less than 180 seconds, less than 120 seconds, less than 90 seconds, less than 60 seconds, less than 30 seconds, less than 15 seconds, or less than 5 seconds. The total power of the UV exposure can be, for example, from 50 mW/cm$^2$ to 500 mW/cm$^2$, from 50 mW/cm$^2$ to 400 mW/cm$^2$, from 50 mW/cm$^2$ to 300 mW/cm$^2$, from 100 mW/cm$^2$ to 300 mW/cm$^2$, or from 150 mW/cm$^2$ to 250 mW/cm$^2$.

An actinic radiation-curable coreactive composition can be exposed to a UV dose of 1 J/cm$^2$ to 4 J/cm$^2$ to cure the composition. The UV source is an 8 W lamp with a UVA spectrum. Other doses and/or other UV sources can be used. A UV dose for curing a composition can be, for example, from 0.5 J/cm$^2$ to 4 J/cm$^2$, from 0.5 J/cm$^2$ to 3 J/cm$^2$, from 1 J/cm$^2$ to 2 J/cm$^2$, or from 1 J/cm$^2$ to 1.5 J/cm$^2$.

An actinic radiation-curable coreactive composition can also be cured with radiation at blue wavelength ranges such as using a light-emitting diode.

Examples of actinic radiation-curable sealant compositions suitable for use in seal caps are disclosed, for example, in U.S. Pat. Nos. 8,729,198; 8,729,198; 9,533,798; 10,233, 369; U.S. Application Publication No. 2019/0169465; PCT International Publication No. PCT/US2018/36746; U.S. Application Publication No. 2018/0215974; and U.S. Pat. No. 7,438,974.

A free radical polymerizable coreactive composition can be transmissive to actinic radiation to an extent that the incident actinic radiation can generate sufficient free radicals to allow the free radical polymerizable coreactive composition to fully cure.

For example, a coreactive composition that is transmissive to actinic radiation can transmit actinic radiation through a thickness of the coreactive composition, for example, of from 1 mm to 30 mm, from 1 mm to 25 mm, from 1 mm to 20 mm, from 1 mm to 15 mm, or from 1 mm to 10 mm.

A free radical polymerizable coreactive composition can be partially transmissive to actinic radiation to an extent that the incident actinic radiation can generate sufficient free radicals to initiate free radical polymerization of the coreactive composition in at least a portion of the exposed coreactive composition. The unexposed portion of the coreactive composition can cure by another free radical mechanism such as a dark cure mechanism or can cure by a non-free radical mechanism.

A free radical-initiating wavelength range can depend on the type of free radical generators in the coreactive composition.

The first coreactive composition can have the same curing rate as the second coreactive composition or can have a different curing rate than the second coreactive composition. For example, to facilitate handling, the first coreactive composition used to fabricate a seal cap shell can have a faster curing rate than the second coreactive composition. The cure rates of the coreactive compositions can be selected to enhance one or more properties of the inner and outer portions of a seal cap.

Using coreactive three-dimensional printing, coreactive compositions can be deposited, for example at speeds from 1 mm/sec to 400 mm/sec and/or at flow rates from 0.1 mL/min to 20,000 mL/min.

The first and second coreactive compositions can be the same or different. For example, different coreactive compositions can comprise differences in the type and amounts of the constituents can result in different portions of the seal cap having different properties. For example, the coreactive compositions used to form a seal cap can comprise reactants, catalysts, adhesion promoters, filler, reactive diluents, colorants, rheological control agents, and/or photochromic agents that can be the same or different or be present in a different wt % or vol % than another layer of the multilayer seal cap. Coreactive compositions can also comprise the same or different curing chemistries.

A coreactive composition capable of curing without exposure to actinic radiation can be deposited and allowed to cure and the rate of cure will be determined by, for example, the curing chemistry, the type and amount of catalyst, the temperature, and the viscosity of the deposited coreactive composition. Following deposition, a coreactive composition can be exposed to heat to accelerate curing of at least a portion of the coreactive composition.

Cure of a free radical polymerizable coreactive composition can be initiated by activating the free radical generator, for example, by exposing the free-radical polymerizable coreactive composition to actinic radiation or heat.

For example, a free radical polymerizable coreactive composition can be exposed to actinic radiation while the free radical polymerizable coreactive composition is in the three-dimensional printing apparatus, during deposition of the free radical polymerizable coreactive composition, and/or after the free radical polymerizable coreactive composition has been deposited. The deposited free radical polymerizable coreactive composition can be exposed to actinic radiation, for example, after the coreactive composition is initially deposited or, depending on the method of fabrication, after the seal cap shell is fabricated, after the successive layers are applied onto as fastener to form a seal cap, or after a seal cap is applied onto a fastener.

A seal cap shell can be fabricated using an actinic radiation-curable coreactive composition and/or the interior volume can comprise an actinic-radiation curable-coreactive composition. Both the seal cap shell and the sealant filling the interior volume can comprise a coreactive composition that is not curable using actinic radiation. The shell can comprise an actinic radiation-curable composition and the sealant filling the internal volume can comprise a coreactive composition that is not actinic radiation-curable. The shell of a seal cap can comprise a coreactive composition that is not curable using actinic radiation and the sealant filling the internal volume can comprise an actinic radiation-curable coreactive composition.

The seal cap shell can be fabricated by depositing successive layers of an actinic radiation-curable coreactive composition using three-dimensional printing.

A shell can also be exposed to actinic radiation after being fabricated and before the interior volume is filled with an actinic radiation-curable coreactive composition to partially cure the shell or to fully cure the shell. The shell can be at least partially cured to provide a retainer for the interior composition and to facilitate the ability to handle the seal cap and assemble the seal cap over a fastener.

When building the shell, the physical properties of the coreactive composition can be such that the deposited coreactive composition maintains its intended shape and has sufficient mechanical strength to support overlying layers of the coreactive composition before an underlying layer has fully cured. The physical properties can be determined, in part, by the amounts of the constituents in the composition, by the type and rate of cure and the like.

A seal cap can be fabricated by printing coreactive compositions that do not require exposure to actinic radiation to initiate the chemical reaction. The shell can be fabricated using three-dimensional printing to deposit successive layers of a coreactive composition to form the seal cap shell, and the interior volume can be filled with the same or different coreactive composition. Procedures similar to those as described for fabricating an actinic radiation-curable seal cap are applicable, with the exception of exposing the coreactive compositions to actinic radiation.

The shell can be at least partially cured at the time the second coreactive composition is deposited within the interior volume. For example, the shell can have a tack free surface or have, for example, a hardness greater than Shore 5A or greater than Shore 10A at the time the second coreactive composition is deposited within the interior volume. The second coreactive composition has compounds that can react with compounds in the first coreactive composition to form chemical bonds, only partial cure of the shell may be desired. Chemical bonding between the shell and the interior sealant can improve the integrity and adhesive strength of the interface. The coreactive composition of adjoining layers can chemically and/or physically interact to form strong interlayer adhesion. The interaction can be through chemical bonding and/or physical entanglement between adjoining layers.

After the shell is fabricated and before filling the interior volume, an optional intermediate layer can be applied to the interior surface of the shell. The intermediate layer can serve to promote adhesion between the shell and the second coreactive composition, promote chemical bonding between the shell and the second coreactive composition and/or can serve to enhance a property such as chemical resistance. The intermediate layer can have a thickness, for example, from 0.05 mm to 3 mm, such as from 0.1 mm to 2 mm. The intermediate layer can be applied to the interior surface of the shell after the shell is fabricated or can be applied to the extruded first coreactive composition and/or second coreactive composition as the extrusion is being deposited by the three-dimensional printing apparatus. For example, an adhesion-promoting layer can be coextruded with the extruded coreactive composition or an adhesion-promoting layer can be applied to the extrudate by contacting at least a portion of the extrudate with an adhesion-promoting composition before the extrudate is deposited onto a substrate or underlying layer of the deposited coreactive composition.

After the shell has been fabricated the interior volume defined by the shell can be at least partially filled with a second coreactive composition. The amount of the second coreactive composition deposited within the interior volume can be selected to minimize the amount of the second coreactive composition that is displaced outside of the seal cap when the seal cap is assembled onto a fastener. At the same time, the amount of the second coreactive composition within the interior volume can be sufficient to facilitate the ability of the second coreactive composition to fully conform to the geometry of the fastener and to minimize the presence of voids when the seal cap is assembled over a fastener.

As with the first coreactive composition, the second coreactive composition can comprise a one-part coreactive composition that is deposited into the interior volume using three dimensional printing or a multiple-part composition in which two or more of the constituents of the actinic radiation-curable coreactive composition are combined in a mixer at the time of use and extruded through a nozzle using a three dimensional printing apparatus into the interior volume. The method of filling the interior volume with the second actinic radiation-curable composition can be designed to avoid entrapment of voids and air pockets.

After the interior volume of the shell is filled with the second coreactive compositions, and before the second coreactive composition cures, the seal cap can be assembled over as fastener. At the time the seal cap is assembled over the fastener it is desirable that the exterior surface of the shell have cured to the extent that the seal cap can be manipulated either manually or robotically. For example, the shell can have a tack-free surface. For example, the shell can have sufficient mechanical strength that it can be picked up and placed with a sufficient amount of force onto a fastener to facilitate the ability of the second coreactive composition to conform to the geometry of the fastener, to displace air pockets, and minimize voids. At the time the seal cap is assembled over the fastener the second coreactive composition can have a viscosity such that the second coreactive composition is retained within the interior volume such that when the seal cap is manipulated over the fastener the second coreactive composition does not flow out from under the base of the seal cap to an appreciable extent. Furthermore, the second coreactive composition can have a sufficiently low viscosity such that it conforms to the fastener and other elements of the part being sealed.

Any suitable photoinitiator can be used such as thermally-activated free radical initiators, or free radical initiators activated by actinic radiation, or photoinitiators and the like.

A photoinitiator can be activated by actinic radiation that can apply energy effective in generating an initiating species from the photopolymerization initiator upon irradiation such as α-rays, γ-rays, X-rays, ultraviolet (UV) light including UVA, UVA, and UVC spectra), visible light, blue light, infrared, near-infrared, or an electron beam. For example, a photoinitiator can be a UV photoinitiator.

Examples of suitable UV photoinitiators include α-hydroxyketones, benzophenone, α,α.-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacyclophosphine oxide, benzophenone photoinitiators, oxime photoinitiators, phosphine oxide photoinitiators, and combinations of any of the foregoing.

Thermally activated free radical initiator can become active at elevated temperature, such as at a temperature greater than 25° C. Examples of suitable thermally activated free radical initiators include organic peroxy compounds, azobis(organonitrile) compounds, N-acyloxyamine compounds, O-imino-isourea compounds, and combinations of any of the foregoing. Examples of suitable organic peroxy compounds, that may be used as thermal polymerization initiators include peroxymonocarbonate esters, such as tertiarybutylperoxy 2-ethylhexyl carbonate and tertiarybutylperoxy isopropyl carbonate; peroxyketals, such as 1,1-di-(tert-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacylperoxides such as 2,4-dichlorobenzoyl peroxide, isobutyryl peroxide, decanoyl peroxide, lauryl peroxide, propionyl peroxide, acetyl peroxide, benzoyl peroxide, and p-chlorobenzoyl peroxide; peroxyesters such as tert-butylperoxy pivalate, tert-butylperoxy octylate, and tert-butylperoxyisobutyrate; methylethylketone peroxide, acetylcyclohexane sulfonyl peroxide, and combinations of any of the foregoing. Other examples of suitable thermal polymerization initiators include 2,5-dimethyl-2,5-di(2-ethylhexanoylperoxy)hexane, and/or 1,1-bis(tert-butylperoxy)-3,3,5-trimethylcyclohexane. Examples of suitable azobis(organonitrile) compounds that may be used as thermal polymerization initiators include azobis(isobutyronitrile), 2,2'-azobis(2-methyl-butanenitrile), and/or azobis(2/1-dimethylvaleronitrile).

A coreactive composition can have a tack free time of less than 8 hours at 25° C./50% RH, less than 6 hours, less than 4 hours, less than 2 hours, less than 1 hour, or less than 30 minutes, where the tack free time is determined according to AS5127/1 (5.8) (Aerospace Standard Test Methods for Aerospace Sealants).

A coreactive composition for forming a seal cap that exhibits a fast time to a hardness of Shore 10A can comprise, for example, coreactants having a fast cure chemistry, systems curable by actinic radiation, catalysts, and combinations of any of the foregoing.

A cured composition can exhibit a fast time to a hardness of Shore 10A of less than 10 minutes where hardness is determined according to ISO 868 at 23° C./55% RH.

A coreactive composition for forming a seal cap that exhibits electrical conductivity, EMI/RFI shielding, and/or static dissipation can comprise, for example, electrically conductive filler or a combination of electrically conductive filler.

A coreactive composition can be substantially free of solvent. For example, a coreactive composition can have a solvent of less than 5 wt %, less than 2 wt %, less than 1 wt %, less than 0.5 wt %, or less than 0.1 wt %, where wt % is based on the total weight of the coreactive composition.

A coreactive composition can comprise, for example, one or more additives such as, for example, catalysts, polymerization initiators, adhesion promoters, reactive diluents, plasticizers, filler, colorants, photochromic agents, rheology modifiers, reactive diluents cure activators and accelerators, corrosion inhibitors, fire retardants, UV stabilizers, rain erosion inhibitors, or a combination of any of the foregoing.

A coreactive composition can comprise a catalyst or combination of catalysts, where the one or more catalysts is selected to catalyze the reaction between the coreactants in the coreactive composition such as the first coreactive compound and the second coreactive compound.

A catalyst or combination of catalysts can be selected to catalyze the reaction of co-reactants in the coreactive composition such as the reaction of the first compound and the second. The appropriate catalyst will depend on the curing chemistry. For example, a thiol-ene or thiol epoxy can comprise an amine catalyst.

A coreactive composition can comprise, for example, from 0.1 wt % to 1 wt %, from 0.2 wt % to 0.9 wt %, from 0.3 wt % to 0.7 wt %, or from 0.4 wt % to 0.6 wt % of a catalyst or combination of catalysts, where wt % is based on the total weight of the coreactive composition.

A catalyst can include a latent catalyst or combination of latent catalysts. Latent catalysts include catalysts that have little or no activity until released or activated, for example, by physical and/or chemical mechanisms. Latent catalysts may be contained within a structure or may be chemically blocked. A controlled release catalyst may release a catalyst upon exposure to ultraviolet radiation, heat, ultrasonication, or moisture. A latent catalyst can be sequestered within a core-shell structure or trapped within a matrix of a crystalline or semi-crystalline polymer where the catalyst can diffuse from the encapsulant with time or upon activation such as by the application of thermal or mechanical energy.

A coreactive composition can comprise a dark cure catalyst or a combination of dark cure catalysts. A dark cure catalyst refers to a catalyst capable of generating free radicals without being exposed to electromagnetic energy.

Dark cure catalysts include, for example, combinations of metal complexes and organic peroxides, tialkylborane complexes, and peroxide-amine redox initiators. A dark cure catalyst can be used in conjunction with a photopolymerization initiator or independent of a photopolymerization initiator.

A coreactive composition based on thiol/thiol curing chemistries can comprise a cure activator or a combination of cure activators to initiate the thiol/thiol polymerization reaction. Cure activators can be used for example in coreactive compositions in which both the first compound and the second compound comprise thiol-terminated sulfur-containing prepolymers, such as thiol-terminated polysulfide prepolymers.

A cure activator can comprise an oxidizing agent capable of oxidizing mercaptan groups to form disulfide bonds. Examples of suitable oxidizing agents include lead dioxide, manganese dioxide, calcium dioxide, sodium perborate monohydrate, calcium peroxide, zinc peroxide, and dichromate.

A cure activator can comprise an inorganic activator, an organic activator, or a combination thereof.

Examples of suitable inorganic activators include metal oxides. Examples of suitable metal oxide activators include zinc oxide (ZnO), lead oxide (PbO), lead peroxide ($PbO_3$), manganese dioxide ($MnO_2$), sodium perborate ($NaBO_3 \cdot H_2O$), potassium permanganate ($KMnO_4$), calcium peroxide ($CaCO_3$), barium peroxide ($BaO_3$), cumene hydroperoxide, and combinations of any of the foregoing. A cure activator can be $MnO_2$.

A coreactive composition based on thiol/thiol curing chemistries can comprise, for example, from 1 wt % to 10 wt % of a cure activator or combination of cure activators, wherein wt % is based on the total weight of the composition. For example, a coreactive composition can comprise from 1 wt % to 9 wt %, from 2 wt % to 8 wt %, from 3 wt % to 7 wt %, or from 4 wt % to 6 wt % of an activator or a combination of cure activators, wherein wt % is based on the total weight of the composition. For example, a coreactive composition can comprise greater than 1 wt % of a cure activator or a combination of cure activators, greater than 2 wt %, greater than 3 wt %, greater than 4 wt %, greater than 5 wt %, or greater than 6 wt % of a cure actuator or combination of cure activators, wherein wt % is based on the total weight of the composition.

A coreactive composition based on thiol/thiol curing chemistries can include a cure accelerator or combination of cure accelerators.

A cure accelerator can act as sulfur donors to generate active sulfur fragments capable of reacting with the thiol groups of a thiol-terminated polysulfide prepolymer.

Examples of suitable cure accelerators include thiazoles, thiurams, sulfenamides, guanidines, dithiocarbamates, xanthates, thioureas, aldehydeamines, and combinations of any of the foregoing.

A cure accelerator can be thiuram polysulfide, a thiuram disulfide, or a combination thereof.

Examples of other suitable cure accelerators also include triazines and sulfides or metallic and amine salts of dialkyldithiophosphoric acids and dithiophosphates such as triazines and sulfides or metallic and amine salts of dialkyldithiophosphoric acids, and combinations of any of the foregoing. Examples of non-sulfur-containing cure accelerators include tetramethyl guanidine (TMG), di-o-tolyl guanidine (DOTG), sodium hydroxide (NaOH), water and bases.

A coreactive composition can comprise, for example, from 0.01 wt % to 2 wt % of a cure accelerator or combination of cure accelerators, from 0.05 wt % to 1.8 wt %, from 0.1 wt % to 1.6 wt %, or from 0.5 wt % to 1.5 wt % of a cure accelerator or combination of cure accelerators, where wt % is based on the total weight of the composition. A coreactive composition can comprise, for example, less than 2 wt %, less than 1.8 wt %, less than 1.6 wt %, less than 1.4 wt %, less than 1.2 wt %, less than 1 wt %, less than 0.5 wt %, less than 0.1 wt %, or less than 0.05 wt % of a cure accelerator or combination of cure accelerators, where wt % is based on the total weight of the composition.

A coreactive composition can comprise an adhesion promoter or combination of adhesion promoters. Adhesion promoters can enhance the adhesion of a coreactive composition to an underlying substrate such as a metal, composite, polymeric, or a ceramic surface, or to a coating such as a primer coating or other coating layer. Adhesion promoters can enhance adhesion to filler and to other layers of a seal cap.

An adhesion promoter can include a phenolic adhesion promoter, a combination of phenolic adhesion promoters, an organo-functional silane, a combination of organo-functional silanes, or a combination of any of the foregoing. An organo-functional alkoxysilane can be an amine-functional alkoxysilane. The organo group can be selected from, for example, a thiol group, an amine group, a hydroxyl group, an epoxy group, an alkynyl group, an alkenyl group, an isocyanate group, or a Michael acceptor group.

A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes. A cooked phenolic resin refers to a phenolic resin that has been co-reacted with a monomer, oligomer, and/or prepolymer.

A phenolic adhesion promoter can comprise the reaction product of a condensation reaction of a phenolic resin with one or more thiol-terminated polysulfides. Phenolic adhesion promoters can be thiol-terminated.

Examples of suitable phenolic resins include those synthesized from 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing. Suitable phenolic resins can be synthesized by the base-catalyzed reaction of phenol with formaldehyde. Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin. Examples of Methylon® resins include Methylon® 75108 (allyl ether of methylol phenol, see U.S. Pat. No. 3,517,082) and Methylon® 75202. Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917. An example of a Durez® resin is Durez® 34071.

A coreactive composition can comprise an organo-functional alkoxysilane adhesion promoter such as an organo-functional alkoxysilane. An organo-functional alkoxysilane can comprise hydrolysable groups bonded to a silicon atom and at least one organofunctional group. An organo-functional alkoxysilane can have the structure $R^a$—$(CH_2)_n$—Si$(—OR)_{3-n}R_n$, where $R^a$ is an organofunctional group, n is 0, 1, or 2, and R is alkyl such as methyl or ethyl. Examples of organofunctional groups include epoxy, amino, methacryloxy, or sulfide groups. An organo-functional alkoxysilane can be a dipodal alkoxysilane having two or more alkoxysilane groups, a functional dipodal alkoxysilane, a non-functional dipodal alkoxysilane or a combination of any of the foregoing. An organofunctional alkoxysilane can be a combination of a monoalkoxysilane and a dipodal alkoxysilane.

Examples of suitable amino-functional alkoxysilanes under the Silquest® tradename include Silquest® A-1100 (γ-aminopropyltriethoxysilane), Silquest® A-1108 (γ-aminopropylsilsesquioxane), Silquest® A-1110 (γ-aminopropyltrimethoxysilane), Silquest® 1120 (N-β-(aminoethyl)-γ-aminopropyltrimethoxysilane), Silquest® 1128 (benzylamino-silane), Silquest® A-1130 (triaminofunctional silane), Silquest® Y-11699 (bis-(γ-triethoxysilylpropyl)amine), Silquest® A-1170 (bis-(γ-trimethoxysilylpropyl)amine), Silquest® A-1387 (polyazamide), Silquest® Y-19139 (ethoxy-based polyazamide), and Silquest® A-2120 (N-β-(aminoethyl)-γ-aminopropylmethyldimethoxysilane). Suitable amine-functional alkoxysilanes are commercially available, for example, from Gelest Inc, from Dow Corning Corporation, and Momentive Performance Materials, Inc.

A coreactive composition can comprise a filler or combination of different filler. A filler can comprise, for example, inorganic filler, organic filler, low-density filler, conductive filler, or a combination of any of the foregoing.

A coreactive composition for forming a multilayer seal cap can comprise an inorganic filler or combination of inorganic filler.

An inorganic filler can be included to provide mechanical reinforcement and to control the rheological properties of the composition such as the viscosity. Inorganic filler may be added to compositions to impart desirable physical properties such as, for example, to increase the impact strength, to control the viscosity, and/or to modify the electrical properties of a cured composition.

Inorganic filler useful in coreactive compositions include carbon black, calcium carbonate, precipitated calcium carbonate, calcium hydroxide, hydrated alumina (aluminum hydroxide), talc, mica, titanium dioxide, alumina silicate, carbonates, chalk, silicates, glass, metal oxides, graphite, and combinations of any of the foregoing.

Suitable calcium carbonate filler can include products such as Socal® 31, Socal® 312, Socal® U1S1, Socal® UaS2, Socal N2R, Winnofil® SPM, and Winnofil® SPT available from Solvay Special Chemicals. A calcium carbonate filler can include a combination of precipitated calcium carbonates.

Inorganic filler can be surface treated to provide hydrophobic or hydrophilic surfaces that can facilitate dispersion and compatibility of the inorganic filler with other components of a coreactive composition. An inorganic filler can include surface-modified particles such as, for example, surface modified silica. The surface of silica particles can be modified, for example, to tailor the hydrophobicity or hydrophilicity of the surface of the silica particle. The surface modification can affect the dispensability of the particles, the viscosity, the curing rate, and/or the adhesion.

A coreactive composition can comprise an organic filler or a combination of organic filler.

Organic filler can be selected to have a low specific gravity and to be resistant to solvents such as JRF Type I and/or to reduce the density of a sealant layer. Suitable organic filler can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7.

Organic filler can have a specific gravity, for example, within a range from 0.85 to 1.15, within a range from 0.9 to 1.1, within a range from 0.9 to 1.05, or from 0.85 to 1.05.

Organic filler can comprise, for example, thermoplastics, thermosets, or a combination thereof. Examples of suitable thermoplastics and thermosets include epoxies, epoxyamides, ETFE copolymers, nylons, polyethylenes, polypropylenes, polyethylene oxides, polypropylene oxides, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, or combinations of any of the foregoing.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

An organic filler can have any suitable shape. For example, an organic filler can comprise fractions of crushed polymer that has been filtered to select a desired size range. An organic filler can comprise substantially spherical particles. Particles can be solid or can be porous.

An organic filler can have a number average particle size, for example, within a range from 1 μm to 100 μm, 2 μm to 40 μm, from 2 μm to 30 μm, from 4 μm to 25 μm, from 4 μm to 20 μm, from 2 μm to 12 μm, or from 5 μm to 15 μm. An organic filler can have a number average particle size, for example, less than 100 μm, less than 75 μm, less than 50 μm, less than 40 μm, or less than 20 μm. Particle size distribution can be determined using a Fischer Sub-Sieve Sizer or by optical inspection.

A coreactive composition for forming a seal cap that exhibits a low-density can comprise, for example, low-density filler such as low-density organic filler, hollow microspheres, coated microspheres, or combinations of any of the foregoing.

A seal cap can exhibit a specific gravity, for example, less than 1.1, less than 1.0, less than 0.9, less than 0.8, or less than 0.7, where specific gravity is determined according to ISO 2781 at 23° C./55% RH.

An organic filler can include a low-density such as a modified, expanded thermoplastic microcapsules. Suitable modified expanded thermoplastic microcapsules can include an exterior coating of a melamine or urea/formaldehyde resin. A coreactive composition can comprise low-density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have a number average initial particle size of 5 μm to 70 μm, in some cases 10 μm to 24 μm, or from 10 μm to 17 μm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel® DE microspheres available from AkzoNobel. Examples of suitable Expancel™ DE microspheres include Expancel®920 DE 40 and Expancel® 920 DE 80. Suitable low-density microcapsules are also available from Kureha Corporation.

Low-density filler such as low-density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787-11. Low-density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to A ISO 787-11.

Low-density filler such as low microcapsules can be characterized by a number average particle diameter from 1 μm to 100 μm and can have a substantially spherical shape. Low-density filler such as low-density microcapsules can be characterized, for example, by a mean particle diameter from 10 μm to 100 μm, from 10 μm to 60 μm, from 10 μm to 40 μm, or from 10 μm to 30 μm, as determined according to ASTM D6913

Low-density filler such as low-density microcapsules can comprise expanded microcapsules or microballoons having a coating of an aminoplast resin such as a melamine resin. Aminoplast resin-coated particles are described, for example, in U.S. Pat. No. 8,993,691. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

With the coating of an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ISO 787-11.

A coreactive composition can comprise micronized oxidized polyethylene homopolymer. An organic filler can include a polyethylenes, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon®.

A coreactive composition can comprise, for example, from 1 wt % to 90 wt % of low-density filler, from 1 wt % to 60 wt %, from 1 wt % to 40 wt % from 1 wt % to 20 wt %, from 1 wt % to 10 wt %, or from 1 wt % to 5 wt % of low-density filler, where wt % is based on the total weight of the composition.

A coreactive composition can comprise greater than 1 wt % low-density filler, greater than 1 wt %, greater than 2 wt %, greater than 3 wt %, greater than 4 wt %, greater than 1 wt %, or greater than 10 wt % low-density filler, where wt % is based on the total weight of the composition.

A coreactive composition can comprise from 1 vol % to 90 vol % low-density filler, from 5 vol % to 70 vol %, from 10 vol % to 60 vol %, from 20 vol % to 50 vol %, or from 30 vol % to 40 vol % low-density filler, where vol % is based on the total volume of the coreactive composition.

A coreactive composition can comprise greater than 0.5 vol % of low-density filler, greater than 1 vol %, greater than 5 vol %, greater than 10 vol %, greater than 20 vol %, greater than 30 vol %, greater than 40 vol %, greater than 50 vol %, greater than 60 vol %, greater than 70 vol %, or greater than 80 vol % low-density filler, where vol % is based on the total volume of the coreactive composition.

A coreactive composition can include a conductive filler or a combination of conductive filler. A conductive filler can include electrically conductive filler, semiconductive filler, thermally conductive filler, magnetic filler, EMI/RFI shielding filler, static dissipative filler, electroactive filler, or a combination of any of the foregoing.

Examples of suitable conductive filler such as electrically conductive filler include metals, metal alloys, conductive oxides, semiconductors, carbon, carbon fiber, and combinations of any of the foregoing.

Other examples of electrically conductive filler include electrically conductive noble metal-based filler such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive filler. Non-noble metal-based materials can also be used and include, for example, non-noble metal-plated non-noble metals such as copper-coated iron particles or nickel-plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive filler and shapes of electrically conductive filler can be used to achieve a desired conductivity, EMI/RFI shielding effectiveness, hardness, and other properties suitable for a particular application.

The amount and type of electrically conductive filler can be selected to produce a coreactive composition which, when cured, exhibits a sheet resistance (four-point resistance) of less than 0.50 Ω/cm$^2$, or a sheet resistance less than 0.15 Ω/cm$^2$. The amount and type of filler can also be selected to provide effective EMI/RFI shielding over a frequency range of from 1 MHz to 18 GHz for an aperture sealed using a coreactive composition.

Organic filler, inorganic filler, and low-density filler can be coated with a metal to provide conductive filler.

An electrically conductive filler can include graphene. Graphene comprises a densely packed honeycomb crystal lattice made of carbon atoms having a thickness equal to the atomic size of one carbon atom, i.e., a monolayer of sp$^2$ hybridized carbon atoms arranged in a two-dimensional lattice.

Conductive filler can comprise magnetic filler or combination of magnetic filler.

The magnetic filler can include a soft magnetic metal. This can enhance permeability of the magnetic mold resin. As a main component of the soft magnetic metal, at least one magnetic material selected from Fe, Fe—Co, Fe—Ni, Fe—Al, and Fe—Si may be used. A magnetic filler can be a soft magnetic metal having a high bulk permeability. As the soft magnetic metal, at least one magnetic material selected can be Fe, FeCo, FeNi, FeAl, and FeSi may be used. Specific examples include a permalloy (FeNi alloy), a super permalloy (FeNiMo alloy), a sendust (FeSiAl alloy), an FeSi alloy, an FeCo alloy, an FeCr alloy, an FeCrSi alloy, FeNiCo alloy, and Fe. Other examples of magnetic filler include iron-based powder, iron-nickel based powder, iron powder, ferrite powder, Alnico powder, $Sm_2Co_{17}$ powder, Nd—B—Fe powder, barium ferrite $BaFe_2O_4$, bismuth ferrite $BiFeO_3$, chromium dioxide $CrO_2$, SmFeN, NdFeB, and SmCo.

A coreactive composition can comprise a hydroxyl-functional vinyl ether or combination of hydroxyl-functional vinyl ethers. A reactive diluent can be used to reduce the viscosity of the composition. A reactive diluent can be a low molecular weight compound such as having a molecular weight less than 400 Da having at least one functional group capable of reacting with at least one of the reactants of the composition and become part of the cross-linked network. A reactive diluent can have, for example, one functional group, or two functional groups. A reactive dilute can be used to control the viscosity of a composition or improve the wetting of filler in a coreactive composition.

A hydroxyl-functional vinyl ether as a reactive diluent can have the structure of Formula (12):

$$CH_2=CH-O-(CH_2)_t-OH \quad (12)$$

where t is an integer from 2 to 10. In hydroxyl-functional vinyl ethers of Formula (12), t can be 1, 2, 3, 4, 5, or t can be 6. Examples of suitable hydroxyl-functional vinyl ethers include 1-methyl-3-hydroxypropyl vinyl ether, 4-hydroxybutyl vinyl ether, and a combination thereof. A hydroxyl-functional vinyl ether can be 4-hydroxybutyl vinyl ether.

A coreactive composition can comprise, for example, from 0.1 wt % to 10 wt % of a hydroxyl-functional vinyl ether, from 0.2 wt % to 9 wt %, from 0.3 wt % to 0.7 wt % and from 0.4 wt % to 0.7 wt %, where wt % is based on the total weight of the curable composition.

A coreactive composition can comprise an amino-functional vinyl ether or combination of amino-functional vinyl ethers as a reactive diluent.

An amino-functional vinyl ether as a reactive diluent can have the structure of Formula (13):

$$CH_2=CH-O-(CH_2)_w-NH_2 \quad (13)$$

where w is an integer from 2 to 10. In amino-functional vinyl ethers of Formula (13), w can be 1, 2, 3, 4, 5, or t can be 6. Examples of suitable amino-functional vinyl ethers include 1-methyl-3-aminopropyl vinyl ether, 4-aminobutyl vinyl ether, and a combination of any of the foregoing. An amino-functional vinyl ether can be 4-aminobutyl vinyl ether as a reactive diluent.

A coreactive composition can comprise, for example, from 0.1 wt % to 10 wt % of an amino-functional vinyl ether, from 0.2 wt % to 9 wt %, from 0.3 wt % to 0.7 wt % and from 0.4 wt % to 0.7 wt %, where wt % is based on the total weight of the coreactive composition.

A coreactive composition can comprise vinyl-based diluents such as styrene, α-methyl styrene and para-vinyl toluene; vinyl acetate; and/or n-vinyl pyrrolidone as a reactive diluent.

A coreactive composition can contain a plasticizer or a combination of plasticizers. Plasticizers can be included to adjust the viscosity of the composition and to facilitate application.

Examples of suitable plasticizers include a combination of phthalates, terephathlic, isophathalic, hydrogenated terphenyls, quaterphenyls and higher or polyphenyls, phthalate esters, chlorinated paraffins, modified polyphenyl, tung oil, benzoates, dibenzoates, thermoplastic polyurethane plasticizers, phthalate esters, naphthalene sulfonate, trimellitates, adipates, sebacates, maleates, sulfonamides, organophosphates, polybutene, butyl acetate, butyl cellosolve, butyl carbitol acetate, dipentene, tributyl phosphate, hexadecanol, diallyl phthalate, sucrose acetate isobutyrate, epoxy ester of iso-octyl tallate, benzophenone and combinations of any of the foregoing.

A coreactive composition can comprise, for example, from 0.5 wt % to 7 wt % of a plasticizer or combination of plasticizers from 1 wt % to 6 wt %, from 2 wt % to 5 wt % or from 2 wt % to 4 wt % of a plasticizer or combination of plasticizers, where wt % is based on the total weight of the coreactive composition.

A coreactive composition can comprise, for example, less than 8 wt % plasticizer, less than 6 wt %, less than 4 wt %, or less than 2 wt % of a plasticizer or combination of plasticizers, where wt % is based on the total weight of the coreactive composition.

A coreactive composition can comprise a photochromic agent sensitive to the degree of cure or the extent of exposure to actinic radiation. A cure indicator can change color upon exposure to actinic radiation, which can be permanent or reversible. A cure indicator can be initially transparent and become colored upon exposure to actinic radiation or can be initially colored and become transparent upon exposure to actinic radiation.

A coreactive composition provided by the present disclosure can comprise a corrosion inhibitor or combination of corrosion inhibitors.

Examples of suitable corrosion inhibitors include zinc phosphate-based corrosion inhibitors, a lithium silicate corrosion inhibitor such as lithium orthosilicate ($Li_4SiO_4$) and lithium metasilicate ($Li_2SiO_3$), MgO, an azole, a monomeric amino acid, a dimeric amino acid, an oligomeric amino acid, a nitrogen-containing heterocyclic compound such as an azole, oxazole, thiazole, thiazolines, imidazole, diazole, pyridine, indolizine, and triazine, tetrazole, and/or tolyltriazole, corrosion resistant particles such as inorganic oxide particles, including for example, zinc oxide (ZnO), magnesium oxide (MgO), cerium oxide ($CeO_2$), molybdenum oxide ($MoO_3$), and/or silicon dioxide ($SiO_2$), and combinations of any of the foregoing.

A coreactive composition can comprise less than 5 wt % of a corrosion inhibitor or combination of corrosion inhibitors, less than 3 wt %, less than 2 wt %, less than 1 wt %, or less than 0.5 wt % of a corrosion inhibitor or combination of a corrosion inhibitors, where wt % is based on the total weight of the coreactive composition.

A coreactive composition can comprise a fire retardant or combination of fire retardants.

A fire retardant can include an inorganic fire retardant, an organic fire retardant, or a combination thereof.

Examples of suitable inorganic fire retardants include aluminum hydroxide, magnesium hydroxide, zinc borate, antimony oxides, hydromagnesite, aluminum trihydroxide (ATH), calcium phosphate, titanium oxide, zinc oxide, magnesium carbonate, barium sulfate, barium borate, kaolinite, silica, antimony oxides, and combinations of any of the foregoing.

Examples of suitable organic fire retardants include halocarbons, halogenated esters, halogenated ethers, chlorinated and/or brominated flame retardants, halogen free compounds such as organophosphorus compounds, organonitrogen compounds, and combinations of any of the foregoing.

A coreactive composition can comprise, for example, from 1 wt % to 30 wt %, such as from 1 wt % to 20 wt %, or from 1 wt % to 10 wt % of a flame retardant or combination of flame retardants based on the total weight of the coreactive composition. For example, a coreactive composition can comprise less than 30 wt %, less than 20 wt %, less than 10 wt %, less than 5 wt %, or less than 2 wt %, of a flame retardant or combination of flame retardants based on the total weight of the coreactive composition.

A coreactive composition can comprise a moisture control additive or combination of moisture control additives.

Examples of suitable moisture control additives include synthetic zeolite, activated alumina, silica gel, calcium oxide, magnesium oxide, molecular sieve, anhydrous sodium sulphate, anhydrous magnesium sulphate, alkoxysilanes, and combinations of any of the foregoing.

A coreactive composition can comprise less than 5 wt % of a moisture control additive or combination of moisture control additives, less than 3 wt %, less than 2 wt %, less than 1 wt %, or less than 0.5 wt % of a moisture control additive or combination of a moisture control additives, where wt % is based on the total weight of the coreactive composition.

A coreactive composition can comprise a UV stabilizer or a combination of UV stabilizers. UV stabilizers include UV absorbers and hindered amine light stabilizers. Examples of suitable UV stabilizers include products under the tradenames Cyasorb® (Solvay), Uvinul® (BASF), and Tinuvin® (BASF).

Layers of a seal cap can be designed to optimize certain desired properties such as including chemical resistance, corrosion resistance, hydrolytic stability, low temperature flexibility, high temperature resistance, and/or the ability to dissipate electrical charge. The materials forming the layers of a seal cap such as the seal cap shell, the material filling interior, and/or other layers can be selected to optimize one or more desired properties.

For example, a layer that exhibits low temperature flexibility can comprise prepolymers such as silicones, polytetrafluoroethylenes, polythioethers, polysulfides, polyformals, polybutadienes, certain elastomers, and combinations of any of the foregoing.

A layer that exhibits hydrolytic stability can comprise, for example, prepolymers such as silicones, polytetrafluoroethylenes, polythioethers, polysulfides, polyformals, polybutadienes, certain elastomers, and combinations of any of the foregoing, or compositions having a high crosslinking density and/or can comprise an elastomer.

A layer that exhibits high temperature resistance can comprise, for example, prepolymers such as silicones, polytetrafluoroethylenes, polythioethers, polysulfides, polyformals, polybutadienes, certain elastomer, and combinations of any of the foregoing; or compositions having a high crosslinking density.

A layer hat exhibits a high tensile strength can comprise, for example, elastomeric prepolymers such a silicones and polybutadiene, compositions having high crosslinking density, inorganic filler, and combinations of any of the foregoing.

A layer that exhibits a high % elongation can comprise, for example, elastomeric prepolymers such a silicones and polybutadiene, compositions having high crosslinking density, inorganic filler, and combinations of any of the foregoing.

A layer that exhibits substrate bonding or bonding to a primer coating can comprise, for example, adhesion promoters such as organo-functional alkoxysilanes, phenolic resins, cooked phenolic resins, and combinations of any of the foregoing, titanates, partially hydrolyzed alkoxysilanes, or combinations thereof.

A layer that exhibits interlayer adhesion can comprise, for example, adhesion promoters, unreacted functional groups that are reactive with compounds in the adjoining layer, and combinations thereof.

A layer that exhibits a fast tack free time can comprise, for example, coreactants having a fast cure chemistry, systems curable by actinic radiation, catalysts, and combinations of any of the foregoing.

A layer that exhibits a fast time to a hardness of Shore 10A can comprise, for example, coreactants having a fast cure chemistry, systems curable by actinic radiation, catalysts, and combinations of any of the foregoing.

A layer that exhibits electrical conductivity, EMI/RFI shielding, and/or static dissipation can comprise, for example, electrically conductive filler or a combination of electrically conductive filler.

A layer that exhibits a low-density can comprise, for example, low-density filler such as low-density organic filler, hollow microspheres, coated microspheres, or combinations of any of the foregoing.

A layer that exhibits corrosion resistance can comprise, for example, one or more corrosion inhibitors.

A layer that exhibits corrosion resistance can comprise, for example, one or more inorganic filler.

The methods of the present invention use coreactive three-dimensional printing to fabricate a seal cap or portions of a seal cap. Coreactive three-dimensional printing refers to robotic manufacturing methods in which a coreactive composition is extruded through a nozzle and deposited using automated control. In coreactive three-dimensional printing a one-part coreactive composition can be pumped into the three-dimensional printing apparatus and the curing reaction can be initiated by application of energy such as by exposing the coreactive composition to UV radiation. Alternatively, at least two coreactive components can be combined and mixed to form a coreactive composition, which can then extruded through a nozzle and deposited.

Three-dimensional printing equipment for fabricating a part can comprise one or more pumps, one or more mixers, and one or more nozzles. One or more coreactive compositions can be pumped into the one or more mixers and forced under pressure through one or more nozzles directed onto a surface or a previously applied layer.

The three-dimensional printing equipment can comprise, for example, pressure controls, extrusion dies, coextrusion dies, coating applicators, temperature control elements, elements for applying energy to the coreactive composition, or combinations of any of the foregoing.

The three-dimensional printing equipment can comprise a build apparatus for moving a nozzle in three dimensions with respect to a surface. The motion of the three-dimensional printing apparatus can be controlled by a processor.

A coreactive composition can be deposited using any suitable coreactive three-dimensional printing apparatus. The selection of a suitable coreactive three-dimensional printing apparatus can depend on a number of factors including the deposition volume, the viscosity of the coreactive composition, the deposition rate, the reaction rate of the coreactive compounds, and the complexity and size of the chemically resistant part being fabricated. Each of the two or more coreactive components can be introduced into an independent pump and injected into a mixer to combine and mix the two coreactive components to form the coreactive composition. A nozzle can be coupled to the mixer and the mixed coreactive composition can be forced under pressure or extruded through the nozzle.

A pump can be, for example, a positive displacement pump, a syringe pump, a piston pump, or a progressive cavity pump. The two pumps delivering the two coreactive components can be placed in parallel or placed in series. A suitable pump can be capable of pushing a liquid or viscous liquid through a nozzle orifice. This process can also be referred to as extrusion. A coreactive component can also be introduced into the mixer using two pumps in series.

For example, two or more coreactive components can be deposited by dispensing materials through a disposable nozzle attached to a progressive cavity two-component system where the coreactive components are mixed in-line. A two-component system can comprise, for example, two progressive cavity pumps that separately dose coreactive components into a disposable static mixer dispenser or into a dynamic mixer. Other suitable pumps include positive displacement pumps, syringe pumps, piston pumps, and progressive cavity pumps. After mixing to form a coreactive composition, the coreactive composition forms an extrudate as it is forced under pressure through one or more dies and/or one or nozzles to be deposited onto a base to provide an initial layer of a chemically resistant part, and successive layers can be deposited onto and/or adjacent a previously deposited layer. The deposition system can be positioned orthogonal to the base, but also may be set at any suitable angle to form the extrudate such that the extrudate and deposition system form an obtuse angle with the extrudate being parallel to the base. The extrudate refers to the coreactive composition after the coreactive components are mixed, for example, in a static mixer or in a dynamic mixer. The extrudate can be shaped upon passing through a die and/or nozzle.

The base, the deposition system, or both the base and the deposition system may be articulate to build up a three-dimensional chemically resistant part. The motion can be made in a predetermined manner, which may be accomplished using any suitable CAD/CAM method and apparatus such as robotics and/or computerize machine tool interfaces.

An extrudate formed by extruding a coreactive composition through a nozzle of a three-dimensional printing apparatus can be deposited in any orientation. For example, the nozzle can be directed downwards, upwards, sideways, or at any angle in between. In this way a coreactive composition can be deposited as a vertical wall or as an overhang. An extrudate can be deposited on a vertical wall, the lower surface of a tilted wall, or on the bottom of a horizontal surface. The use of an extrudate with a fast curing chemistry can facilitate the ability of an overlying layer to be deposited adjoining an underlying layer such that an angled surface can be fabricated. The angled surface can tilt upward with respect to horizontal or downward with respect to horizontal.

An extrudate may be dispensed continuously or intermittently to form an initial layer and successive layers. For intermittent deposition, a deposition system may interface with a switch to shut off the pumps, such as the progressive cavity pumps and thereby interrupt the flow of the coreactive composition.

A three-dimensional printing system can include an in-line static and/or dynamic mixer as well as separate pressurized pumping compartments to hold the at least two coreactive components and feed the coreactive components into the static and/or dynamic mixer. A mixer such as an active mixer can comprise a variable speed central impeller having high shear blades within a nozzle. A range of nozzles may be used which have a minimum dimension, for example, from 0.2 mm to 100 mm, from 0.5 mm to 75 mm, from 1 mm to 50 mm, or from 5 mm to 25 mm. A nozzle can have a minimum dimension, for example, greater than 1 mm, greater than 2 mm, greater than 5 mm, greater than 10 mm, greater than 20 mm, greater than 30 mm, greater than 40 mm, greater than 50 mm, greater than 60 mm, greater than 70 mm, greater than 80 mm, or greater than 90 mm. A nozzle can have a minimum dimension, for example, less than 100 mm, less than 90 mm, less than 80 mm, less than 70 mm, less than 60 mm, less than 50 mm, less than 40 mm, less than 30 mm, less than 20 mm, less than 10 mm, or less than 5 mm. A nozzle can have any suitable cross-sectional dimension such as, for example, round, spherical, oval, rectangular, square, trapezoidal, triangular, planar, or other suitable shape. The aspect ratio or ratio of the orthogonal dimensions can be any suitable dimensions as appropriate for fabricating a chemically resistant part such as a 1:1, greater than 1:2, greater than 1:3, greater than 1:5, or greater than 1:10.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the coreactive materials. The dispensing section can be, for example, a straight tube having any of the above orifice diameters. The length of the dispensing section can be configured to provide a region in which the coreactive components can begin to react and build viscosity before being deposited on the article. The length of the dispensing section can be selected, for example, based on the speed of deposition, the rate of reaction of the co-reactants, and the viscosity of the coreactive composition.

A coreactive composition can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the coreactive composition.

A coreactive composition can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL/min. The volume flow rate can depend, for example, on the viscosity of a coreactive composition, the extrusion pressure, the nozzle diameter, and the reaction rate of the coreactive compounds.

A coreactive composition can be used at a deposition speed, for example, from 1 mm/sec to 400 mm/sec, such as from 5 mm/sec to 300 mm/sec, from 10 mm/sec to 200 mm/sec, or from 15 mm/sec to 150 mm/sec. The deposition speed can depend, for example, on the viscosity of the coreactive composition, the extrusion pressure, the nozzle diameter, and the reaction rate of the coreactive compounds. The deposition speed refers to the speed at which a nozzle used to extrude a coreactive composition moves with respect to a surface onto which the coreactive composition is being deposited.

A static and/or dynamic mixing nozzle can be heated or cooled to control, for example, the rate of reaction between the coreactive compounds and/or the viscosity of the coreactive components. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the coreactive compounds.

The speed at which the coreactive composition reacts to form the thermoset polymeric matrix can be determined and/or controlled the selection of the reactive functional groups of the coreactive compounds. The reaction speed can also be determined by factors that lower the activation energy of the reaction such as heat and/or catalysts.

Reaction rates can be reflected in the gel time of a coreactive composition. A fast curing chemistry refers to a chemistry in which the coreactive compounds have a gel time, for example, less than 30 minutes, less than 20 minutes, less than 10 minutes, less than 5 minutes, less than 4 minutes, less than 3 minutes, less than 2 minutes, less than 1 minute, less than 45 seconds, less than 30 seconds, less than 15 seconds, or less than 5 seconds. A coreactive composition can have a gel time, for example, from 0.1 seconds to 5 minutes, from 0.2 seconds to 3 minutes, from 0.5 seconds to 2 minutes, from 1 second to 1 minute, or from 2 seconds to 40 seconds. Gel time is the time following mixing the coreactive components when the coreactive composition is no longer stirrable by hand. A gel time of a latent coreactive composition refers to the time from when the curing reaction is first initiated until the coreactive composition is no longer stirrable by hand.

Because the coreactive components can be uniformly combined and mixed a coreactive composition can begin to cure immediately upon mixing, the dimensions of the coreactive composition and the extrudate that is forced through the nozzle is not particularly limited. Thus, coreactive additive manufacturing facilitates the use of large dimension extrudates, which facilitates the ability to rapidly fabricate both small and large seal caps.

Using coreactive three-dimensional printing methods, coreactive compositions can be deposited, for example at speeds from 1 mm/sec to 400 mm/sec and/or at flow rates from 0.1 mL/min to 20,000 mL/min.

A seal cap and layers of a seal cap including a seal cap shell can have visually smooth surfaces. Photographs of seal cap shells are shown in FIGS. 3A-3B, which show seal cap shells having progressively smoother surfaces (from FIG. 3A to FIG. 3C) achieved by reducing the thickness of the printed layers. FIG. 3D shows confocal laser scanning microscopy surface profiles at 10× magnification of the exterior surfaces of the corresponding seal cap shells shown in FIGS. 3A-3C. The seal caps and seal cap surface shown in FIGS. 3A-3D were made using a polyurea coreactive composition formed by combining a polyamine component and a polyisocyanate component.

A seal cap can have properties suitable for a specific use application. Relevant properties include chemical resistance, low-temperature flexibility, hydrolytic stability, high temperature resistance, tensile strength, % elongation, substrate adhesion, adhesion to an adjoining sealant layer, tack-free time, time to Shore 10A hardness, electrical conductivity, static dissipation, thermal conductivity, low-density, corrosion resistance, surface hardness, fire retardance, UV resistance, rain erosion resistance, dielectric breakdown strength, and combinations of any of the foregoing.

For aerospace applications properties may include, chemical resistance such as resistance to fuels, hydraulic fluids, oils, greases, lubricants and solvents, low temperature flexibility, high temperature resistance, ability to dissipate electrical charge, and/or dielectric breakdown strength. When fully cured a seal cap can be visually transparent to facilitate visual inspection of the interface between a fastener and the sealant.

When fully cured the shell and the interior volume comprising the cured second coreactive composition can exhibit one or more different properties. For example, the shell can exhibit chemical resistance, electrical conductivity, hydrolytic stability, high dielectric breakdown strength, or a combination of any of the foregoing. For example, when cured, the second coreactive composition can exhibit adhesion to a fastener, chemical resistance, low-density, high tensile strength, high % elongation, or a combination of any of the foregoing.

A seal cap can exhibit a percent volume swell of not greater than 40%, in some cases not greater than 25%, in some cases not greater than 20%, and in other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Following exposure to Jet Reference Fluid (JRF Type 1) according to ISO 1817 for 168 hours at 60° C., a cured composition provided can exhibit a tensile strength greater than 1.4 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH.

Following exposure to de-icing fluid according to ISO 11075 Type 1 for 168 hours at 60° C., a cured composition can exhibit a tensile strength greater than 1 MPa determined according to ISO 37, and a tensile elongation greater than 150% determined according to ISO 37, where the tests are performed at a temperature of 23° C., and a humidity of 55% RH.

Following exposure to phosphate ester hydraulic fluid (Skydrol® LD-4) for 1,000 hours at 70° C., a cured composition can exhibit a tensile strength greater than 1 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH. A chemically resistant composition can exhibit a % swell less than 25%, less than 20%, less than 15%, or less than 10%, following immersion in a chemical for 7 days at 70° C., where % swell is determined according to EN ISO 10563.

A seal cap can exhibit a hardness, for example, greater than Shore 20A, greater than Shore 30A, greater than Shore 40A, greater than Shore 50A, or greater than Shore 60A, where hardness is determined according to ISO 868 at 23° C./55% RH.

A seal cap can exhibit a tensile elongation of at least 200% and a tensile strength of at least 200 psi when measured in accordance with the procedure described in AMS 3279, § 3.3.17.1, test procedure AS5127/1, § 7.7.

A seal cap can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A seal cap prepared from a coreactive composition provided by the present disclosure can meet or exceed the requirements for aerospace sealants as set forth in AMS 3277.

An electrically conductive seal cap or a layer of a seal cap provided by the present disclosure can exhibit a surface resistivity, for example, less than 10' Ohm/square, less than 10' Ohm/square, less than 104 Ohm/square, less than 10' Ohm/square, less than $10^2$ Ohm/square, less than 10 Ohm/square, less than $10^{-1}$ Ohm/square, or less than $10^{-2}$ Ohm/square. A surface of an electrically conductive seal cap or a layer of a seal cap provided by the present disclosure can have a surface resistivity, for example, from $10^{-2}$ to $10^2$, from $10^2$ Ohm/square to $10^6$ Ohm/square, or from $10^3$ Ohm/square to $10^5$ Ohm/square. Surface resistivity can be determined according to ASTM D257 at 23° C./55% RH.

A seal cap or a layer of a seal cap provided by the present disclosure can have a volume resistivity, for example, less than $10^6$ Ohm/cm, less than $10^5$ Ohm/cm, less than $10^4$ Ohm/cm, less than $10^3$ Ohm/cm, less than $10^2$ Ohm/cm, less than 10 Ohm/cm, less than $10^{-1}$ Ohm/cm, or less than $10^{-2}$ Ohm/cm. An electrically conductive seal cap or a layer of a seal cap can have a volume resistivity, for example, from $10^{-2}$ Ohm/cm to $10^1$ Ohm/cm, from $10^2$ Ohm/cm to $10^6$ Ohm/cm, or from $10^3$ Ohm/cm to $10^5$ Ohm/cm. Volume resistivity can be determined according to ASTM D257 at 23° C./55% RH.

A seal cap or a layer of a seal cap provided by the present disclosure can have an electrical conductivity, for example, greater than 1 S cm$^{-1}$, greater than 10 S cm$^{-1}$, greater than 100 S cm$^{-1}$, greater than 1,000 S cm$^{-1}$, or greater than 10,000 S cm$^{-1}$. An electrically conductive seal cap can have an electrical conductivity from 1 S cm$^{-1}$ to 10,000 S cm$^{-1}$, from 10 S cm$^{-1}$ to 1,000 cm$^{-1}$ or from 10 S cm$^{-1}$ to 500 S cm$^{-1}$.

A seal cap or a layer of a seal cap provided by the present disclosure can exhibit an attenuation at frequencies within a range from 10 KHz to 20 GHz, for example, of greater than 10 dB, greater than 30 dB, greater than 60 dB, greater than 90 dB, or greater than 120 dB. An electrically conductive seal cap provided by the present disclosure can exhibit an attenuation at frequencies within a range from 10 KHz to 20 GHz, for example, of from 10 dB to 120 dB, from 20 dB to 100 dB, from 30 dB to 90 dB, or from 40 dB to 70 dB.

A seal cap or a layer of a seal cap provided by the present disclosure exhibit a thermal conductivity from 0.1 to 50 W/(m-K), from 0.5 to 30 W/(m-K), from 1 to 30 W/(m-K), from 1 to 20 W/(m-K), from 1 to 10 W/(m-K), from 1 to 5 W/(m-K), from 2 to 25 W/(m-K), or from 5 to 25 W/(m-K).

A seal cap or a layer of a seal cap provided by the present disclosure can exhibit a specific gravity, for example, less than 1.1, less than 1.0, less than 0.9, less than 0.8, or less than 0.7, where specific gravity is determined according to ISO 2781 at 23° C./55% RH.

Coreactive three-dimensional printing methods provided by the present disclosure can be used to fabricate a seal cap in which adjoining layers have a high mechanical strength. Adjoining layers of a coreactive composition can chemically bond and/or physical bond to create a mechanically strong interlayer interface. The strength of the interlayer interface can be determined by measuring the fracture energy according to ASTM D7313. Seal caps made using methods provided by the present disclosure can have a fracture energy that is substantially the same as the fracture energy of an individual layer. For example, the fracture energy of the seal cap and the fracture energy of an individual cured layer of the coreactive composition can be, for example, within less than 10%, less than 5%, less than 2% or less 1%.

Seal caps provided by the present disclosure can be used to seal fasteners. Examples of fasteners include anchors, cap screws, cotter pins, eyebolts, nuts, rivets, self-clinching fasteners, self-tapping screws, sockets, thread cutting screws, turn and wing screws, weld screws, bent bolts, captive panel fasteners, machine screws, retaining rings, screw driver insert bits, self-drilling screws, sems, spring nuts, thread rolling screws, and washers.

A fastener can be a fastener on the surface of a vehicle including, for example, motor vehicles, aerospace vehicles, automobiles, trucks, buses, vans, motorcycles, scooters, recreational motor vehicles; railed vehicles trains, trams, bicycles, airplanes, rockets, spacecraft, jets, helicopters, military vehicles including jeeps, transports, combat support vehicles, personnel carriers, infantry fighting vehicles, mine-protected vehicles, light armored vehicles, light utility vehicles, military trucks, watercraft including ships, boats, and recreational watercraft. The term vehicle is used in its broadest sense and includes all types of aircraft, spacecraft, watercraft, and ground vehicles. For example, a vehicle can include aircraft such as airplanes including private aircraft, and small, medium, or large commercial passenger, freight, and military aircraft; helicopters, including private, commercial, and military helicopters; aerospace vehicles including rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A fastener can be a fastener on a surface of an aerospace vehicle. Examples of aerospace vehicles include F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). A seal cap can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

A fastener can be a fastener on a fuel container such as a fuel tank of an aerospace vehicle.

A fastener can be a fastener that is to be protected from exposure to solvents such as fuel and/or hydraulic fluid under use conditions.

Vehicles such as automotive vehicles and aerospace vehicles comprising a fastener sealed using a method provided by the present disclosure are also included within the scope of the invention.

ASPECTS OF THE INVENTION

The invention can be further defined by one or more of the following aspects.

Aspect 1. A method of sealing a fastener, comprising depositing successive layers comprising a first coreactive composition directly onto the fastener by three-dimensional printing.

Aspect 2. The method of aspect 1, wherein the successive layers are deposited to form a seal cap.

Aspect 3. The method of any one of aspects 1 and 2, further comprising: depositing a second coreactive composition directly onto the first coreactive composition; or simultaneously depositing successive layers of the first coreactive composition and a second coreactive composition onto the fastener.

Aspect 4. The method of any one of aspects 1 to 3, further comprising applying a seal cap shell onto an outermost deposited first coreactive composition, wherein, the seal cap shell comprises an at least partially cured second coreactive composition; and the second coreactive composition is the same as or different than the outermost deposited coreactive composition.

Aspect 5. The method of any one of aspects 1 and 2, further comprising, depositing successive layers of a second coreactive composition by three-dimensional printing to form the seal cap shell over the first coreactive composition.

Aspect 6. A method of fabricating a seal cap, comprising: depositing successive layers of a first coreactive composition by three-dimensional printing to form a seal cap shell defining an interior volume; and filling the interior volume with a second coreactive composition to provide a seal cap.

Aspect 7. The method of aspect 6, wherein filling the interior volume comprises depositing the second coreactive composition using three-dimensional printing.

Aspect 8. The method of any one of aspects 4 to 7, wherein the seal cap shell is in the shape of a dome having a base width from 5 mm to 50 mm preferably 10 mm to 40 mm; a height from 5 mm to 50 mm preferably 20 mm to 40 mm; and an average wall thickness from 0.5 mm to 25 mm preferably 1 mm to 20 mm, from 1.5 mm to 15 mm, or from 2 mm to 10 mm.

Aspect 9. The method of any one of aspects 3 to 8, wherein the first coreactive composition is reactive with the second coreactive composition.

Aspect 10. The method of any one of aspects 3 to 9, wherein the second coreactive composition is the same as the first coreactive composition.

Aspect 11. The method of any one of aspects 3 to 9, wherein the second coreactive composition is different than the first coreactive composition.

Aspect 12. The method of any one of aspects 6 to 11, further comprising after forming the shell and before filling the interior volume, at least partially curing the seal cap shell.

Aspect 13. The method of any one of aspects 3 to 12, wherein each of the first coreactive composition and the second coreactive composition independently comprises a sulfur-containing prepolymer.

Aspect 14. The method of aspect 13, wherein each of the first coreactive composition and the second coreactive composition independently comprises from 40 wt % to 80 wt % of the sulfur-containing prepolymer.

Aspect 15. The method of any one of aspects 13 to 14, wherein the sulfur-containing prepolymer has a sulfur content greater than 10 wt %, wherein wt % is based on the total weight of the sulfur-containing prepolymer.

Aspect 16. The method of any one of aspects 13 to 14, wherein the sulfur-containing prepolymer comprises a polythioether, a polysulfide, a sulfur-containing polyformal, a monosulfide, or a combination of any of the foregoing.

Aspect 17. The method of any one of aspects 3 to 16, wherein, each of the first coreactive composition and the second coreactive composition independently comprises an actinic radiation-curable coreactive composition; and the method further comprises exposing the first coreactive composition and/or the second coreactive composition to actinic radiation before depositing the first coreactive composition and/or the second coreactive composition, while depositing the first coreactive composition and/or the second coreactive composition, and/or after depositing the first coreactive composition and/or the second coreactive composition.

Aspect 18. The method of any one of aspects 1 to 16, wherein the first coreactive composition is curable upon exposure to actinic radiation.

Aspect 19. The method of any one of aspects 3 to 16, wherein the first coreactive composition is not curable upon exposure to actinic radiation.

Aspect 20. A seal cap fabricated using the method of any one of aspects 1 to 19.

Aspect 21. The seal cap of aspect 20, wherein a fracture energy of the fully cured seal cap is substantially the same as the fracture energy of an individual layer forming the seal cap, wherein the fracture energy is determined according to ASTM D7313.

Aspect 22. A seal cap fabricated using the method of any one of aspects 3 to 19, wherein a layer prepared from the first coreactive composition is chemically or physically bonded to a layer prepared from the second coreactive composition.

Aspect 23. A method of sealing a fastener, comprising applying the seal cap of any one of aspects 20 to 22 over a fastener and allowing the first coreactive composition and/or the second coreactive composition to cure.

Aspect 24. A fastener sealed with the seal cap of any one of aspects 20 to 22

Aspect 25. The fastener of aspect 24, wherein the fastener is on a vehicle, such as an aerospace vehicle.

EXAMPLES

Embodiments provided by the present disclosure are further illustrated by reference to the following examples, which describe methods of sealing fasteners and methods of fabricating seal caps using three-dimensional printing. It will be apparent to those skilled in the art that many modifications, both to materials, and methods, may be practiced without departing from the scope of the disclosure.

Example 1

UV Cure Seal Cap

A one-part fuel-resistant sealant formulation, PR2001 B2 aerospace sealant available from PPG Aerospace, included a combination of thiol-terminated polythioether prepolymers, divinyl ether monomers, rheological modifiers, filler, and photoinitiators. The formulation was stored in a UV-opaque tube at −40° C. and thawed to room temperature (25° C.) before use. The sealant formulation was introduced into a three-dimensional printing system consisting of a LulzBot Taz 3D printing gantry and print bed integrated with a ViscoTec Eco-Duo dual extruder. A UV source (UltraFire® WF-501B UV LED flashlight with a peak wavelength of 395 nm) was mounted on the ViscoTec extruder and directed toward the point of application from the extruder 5.5 cm from the print bed.

The fuel-resistant sealant formulation was loaded into opaque Nordson cartridges, which were connected to the ViscoTec extruder using PTFE tubing shielded from ambient light. The loaded cartridges were pressurized to 80 psi under nitrogen and printed using a custom-written G-code that simultaneously directed the print head and print bed while toggling flow of the formulations through the ViscoTec unit. The fuel-resistant sealant formulation was extruded through a static mixing nozzle with an inner diameter of 0.6 mm onto the print bed. The seal cap was built by depositing a continuous spiral of sealant using a print head speed of 120 mm/sec and a flow rate of 1.2 mL/min. Under these conditions the extruded sealant formulation had a G" of about 8E4 and a G' of 1E5 at 3 hours after activating and a G" of 3E5 and a G' of 8.5E5 at 6 hours after activating. The shear storage modulus G' and the shear loss modulus G" were measured using an Anton Paar MCR 302 rheometer with a gap set to 1 mm with a 2 mm-diameter parallel plate spindle, and an oscillation frequency of 1 Hz and amplitude of 0.3% and a plate temperature of 25° C. The seal cap was modeled as a dome-like structure using 3D modeling software. The bottom diameter of the seal cap was 42.4 mm and the height was 39.9 mm.

Example 2

Seal Cap Fabricated Using Thiol/Epoxy Chemistry

A coreactive composition was prepared by combining a first component and a second component based on PR-2001 B1/2, a two-part thiol/epoxy aerospace sealant available from PPG Aerospace.

The first component, PR-2001 B1/2 Part B, included a thiol-terminated polythioetherprepolymer, epoxy-functional alkoxysilane adhesion promoter, and partially hydrogenated quaternary- and higher-polyphenyls. The first component was weighed into a Max 300 L DAC cup (FlackTek) and de-gassed using a standard SpeedMixer® procedure.

The second component, PR-2001 B1/2 Part A, included a bisphenol-A-(epichlorohydrin); epoxy resin. The second component was weighed into a Max 300 L DAC cup (FlackTek) and de-gassed using a standard SpeedMixer® procedure.

The degassed components were transferred from the DAC cups to an Optimum® cartridge using a FlackTek SpeedDisc® and a coreactive composition formed by mixing the two components in a 100:18.5 weight ratio. The coreactive composition was printed using a ViscoTec 2K extruder mounted to a Lulzbot Taz 6 gantry.

Successive layers of the coreactive composition were deposited to build a seal cap shell.

Example 3

Seal Cap Fabricated Using $MnO_2$-Catalyzed Polysulfide Chemistry

A coreactive composition was prepared by combining a first coreactive component and a second coreactive component based on PR-1429 B2, a two-part Mn dioxide-cured polysulfide aerospace sealant available from PPG Aerospace.

The first coreactive component, PR-1429 B2 Part B, included a thiol-terminated polysulfide prepolymer. The first coreactive component was weighed into a Max 300 L DAC cup (FlackTek) and de-gassed using a standard SpeedMixer® procedure.

The second coreactive component, PR-1429 B2 Part A, included a $MnO_2$ catalyst. The second component was weighed into a Max 300 L DAC cup (FlackTek) and de-gassed using a standard SpeedMixer® procedure.

The degassed coreactive components were transferred from the DAC cups to an Optimum cartridge using a FlackTek SpeedDisc® and the coreactive composition formed by mixing the two components in a 100:10 weight ratio was printed using a ViscoTec 2K extruder mounted to a Lulzbot Taz 6 gantry.

Successive layers of the coreactive composition were deposited to build a seal cap shell.

Example 4

UV-Cured Polythioether Seal Cap

Aerospace seal caps were 3D printed using an actinic radiation-curable thiol-ene based resin formulation.

The thiol-ene formulation included a mixture of thiol-terminated and alkenyl-terminated resins, rheological modifiers, fillers, and photo-initiators. The formulation was stored in UV opaque tubes at −40° C. and thawed to 23° C. before use. The thiol-ene formulation was 3D printed using a custom-built 3D printer consisting of a LulzBot Taz 3D printing gantry and print bed integrated with a ViscoTec Preeflow® Eco-DUO dual extruder. A UV source (UltraFire® WF-501B UV LED flashlight with a nominal peak wavelength of 395 nm) was mounted on the ViscoTec extruder and directed toward the point of application from the extruder at a distance of 5.5 cm from the print bed.

The thiol and alkenyl components were loaded into opaque Nordson cartridges, which were connected to the ViscoTec extruder using polytetrafluoroethylene tubes wrapped with aluminum foil to prevent penetration of ambient light. The loaded cartridges were pressurized to 80 psi (0.551 $N/mm^2$) under nitrogen and printed using a custom-written G-code that simultaneously directed the print head and the print bed while toggling flow of the coreactive composition formed by mixing the thiol and alkenyl components through the ViscoTec extruder.

After extrusion was initiated, the UV LED light was switched on. The liquid thiol-ene formulations were extruded through a static mixing nozzle with an inner diameter of 0.6 mm onto the print bed. The seal cap was printed in a continuous spiral pattern using a print head speed of 120 mm/s and a flow rate of 1.2 mL/min. Under these conditions the extruded coreactive composition cured within 5 sec after exiting the extruder.

In this example, the seal cap was modeled as a dome-shaped structure using Autodesk Inventor LT® 2019. The bottom diameter of the seal cap was 42.36 mm and the height was 39.89 mm. Three-dimensional printing of the cured seal cap under these conditions took 9.6 min.

Figure 4:
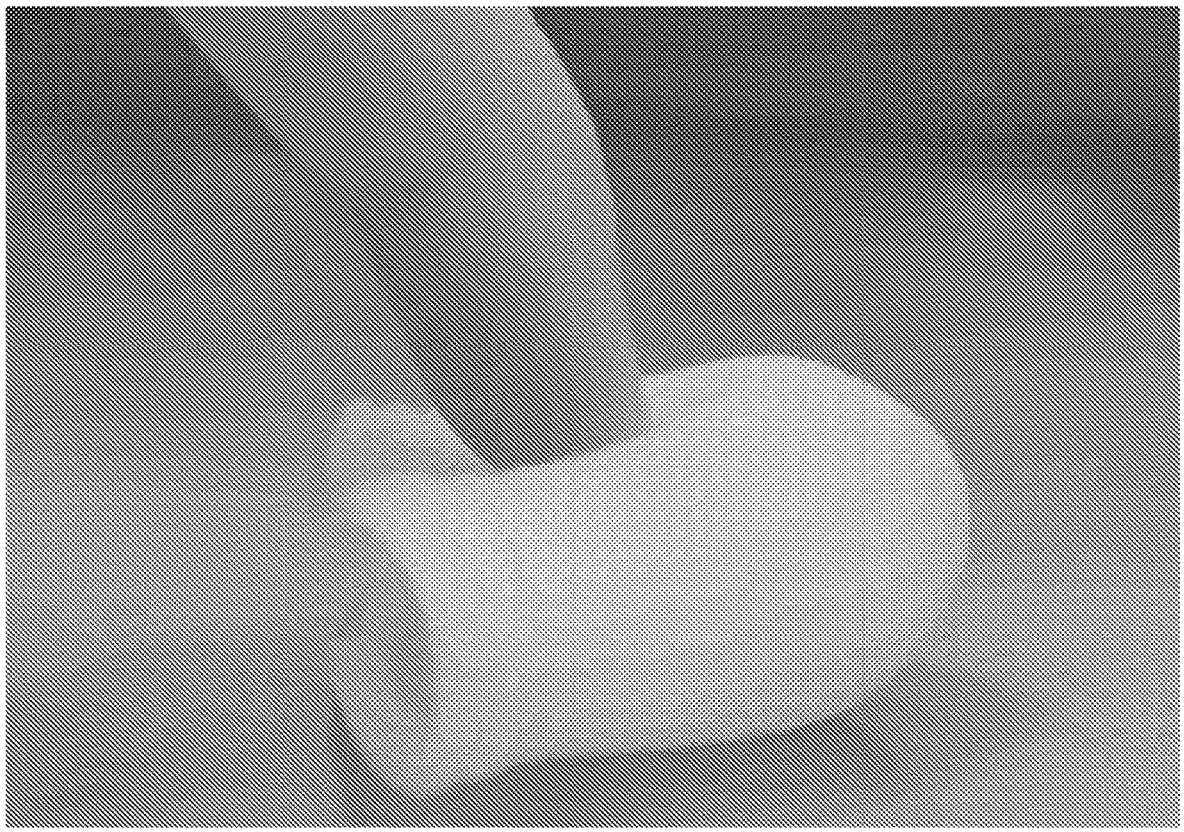
FIG. 4 shows a photograph of a seal cap shell made according to Example 4.

A photograph of the three-dimensionally printed seal cap shell is shown in FIG. 4.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A method of sealing a fastener, comprising:
   depositing successive layers comprising a first coreactive composition directly onto the fastener by three-dimensional printing, the first coreactive composition comprising a first reactive component and a second reactive component
      wherein the successive layers are deposited to form a seal cap; and
   at least one of:
      depositing a second coreactive composition directly onto the first coreactive composition to form a seal cap shell over the first coreactive composition;
      simultaneously depositing successive layers of the first coreactive composition and a second coreactive composition onto the fastener, wherein the second coreactive composition forms a seal cap shell; and
      applying a seal cap shell onto an outermost deposited first coreactive composition, wherein the seal cap shell comprises an at least partially cured second coreactive composition;
   wherein each of the first coreactive composition and the second coreactive composition independently comprise from 40 wt % to 80 wt % of a sulfur-containing prepolymer; and
   wherein the sulfur-containing prepolymer comprises a polythioether, a polysulfide, a sulfur-containing polyformal, a monosulfide, or a combination of any of the foregoing.

2. The method of claim 1, wherein the first coreactive composition is reactive with the second coreactive composition.

3. The method of claim 1, wherein the second coreactive composition is the same as the first coreactive composition.

4. The method of claim 1, wherein the second coreactive composition is different than the first coreactive composition.

5. The method of claim 1, wherein the sulfur-containing prepolymer has a sulfur content greater than 10 wt %, wherein wt % is based on the total weight of the sulfur-containing prepolymer.

6. The method of claim 1, wherein,
   each of the first coreactive composition and the second coreactive composition independently comprises an actinic radiation-curable coreactive composition; and
   the method further comprises exposing the first coreactive composition and/or the second coreactive composition to actinic radiation before depositing the first coreactive composition and/or the second coreactive composition, while depositing the first coreactive composition and/or the second coreactive composition, and/or after depositing the first coreactive composition and/or the second coreactive composition.

7. The method of claim 1, wherein the first coreactive composition is curable upon exposure to actinic radiation.

8. The method of claim 1, wherein the first coreactive composition is not curable upon exposure to actinic radiation.

* * * * *